United States Patent
Choudhury et al.

[19]

[11] Patent Number: 5,933,412
[45] Date of Patent: Aug. 3, 1999

[54] PARALLEL CONNECTION CONTROL

[75] Inventors: Gagan Lal Choudhury, Aberdeen; Madhukar Moreshwar Kshirsagar, Morganville; Malathi Veeraraghavan, Atlantic Highlands, all of N.J.

[73] Assignee: Lucent Technologies Inc., Murray Hill, N.J.

[21] Appl. No.: 08/622,716

[22] Filed: Mar. 26, 1996

Related U.S. Application Data

[63] Continuation-in-part of application No. 08/324,427, Oct. 17, 1994, Pat. No. 5,659,544.

[51] Int. Cl.$^6$ ............................. H04J 3/14; H04L 12/56
[52] U.S. Cl. ....................... 370/218; 370/231; 370/236; 370/397
[58] Field of Search ..................... 370/217, 218, 370/219, 220, 229, 230, 231, 235, 236, 355, 386, 388, 389, 395, 396, 397, 400, 401, 409, 410, 905; 395/200.57, 200.58, 200.59, 200.6, 200.79

[56] References Cited

U.S. PATENT DOCUMENTS

| | | | |
|---|---|---|---|
| 4,991,204 | 2/1991 | Yamamoto et al. | 370/217 |
| 4,993,015 | 2/1991 | Fite, Jr. | 370/248 |
| 4,999,829 | 3/1991 | Fite, Jr. et al. | 370/397 |
| 5,343,194 | 8/1994 | Bowdon | 370/217 |
| 5,440,547 | 8/1995 | Esaki et al. | 370/397 |
| 5,550,816 | 8/1996 | Hardwick et al. | 370/401 |
| 5,764,915 | 6/1998 | Heimsoth et al. | 395/200.57 |
| 5,790,553 | 8/1998 | Deaton, Jr. et al. | 370/466 |

OTHER PUBLICATIONS

Muller, Harald, Flexible Conection Control for Multimedia Broadband Networks, Proc. of ICC '95.
Cherykuri, Rao, ed., ATM Forum/95–0221R2, Draft PNNI Signalling, Jun. 22, 1995.
ITU–T Specifications of Signalling System No. 7, Recommendation Q. 761, 762, 763, 764, Mar. 1993.
Baransel, Cesur, Dobosiewicz, Wlodek, Gburzynski, Pawel, Routing in Multihop Packet Switching Networks: Gb/s Challenge, May/Jun. 1995, pp. 38–61, IEEE Network.
Woodworth, C. Golden, G.D., Gitlin, R.D., An Integrated Multimedia Terminal for Teleconferencing, Nov. 29–Dec. 2, 1993, pp. 399–405, IEEE Global Telecommunications Conference.
Woodworth, C., Karol, M.J., Gitlin, R.D., A Flexible Broadband Packet Switch for A Multimedia Integrated Network, Jun. 23–26, 1991, Proc. International Conference on Communications '91.

*Primary Examiner*—Alpus H. Hsu

[57] ABSTRACT

Parallel connection control ("PCC") processes and switching networks are described. Various aspects of these PCC processes and networks relate to the provision of an alternative switching connection setup to achieve bandwidth savings or lower cost networks with acceptable setup delay. The new approach provides an alternative to existing switch-by-switch sequential connection setup approaches. In the new approach, segments of the connection are set up by executing operations in parallel. The algorithm and network are also extended to address complex control connection tasks, such as the complex bearer control tasks of third-party connection control, unidirectional multicast connection setup, and multiparty-to-multiparty connection control.

73 Claims, 13 Drawing Sheets

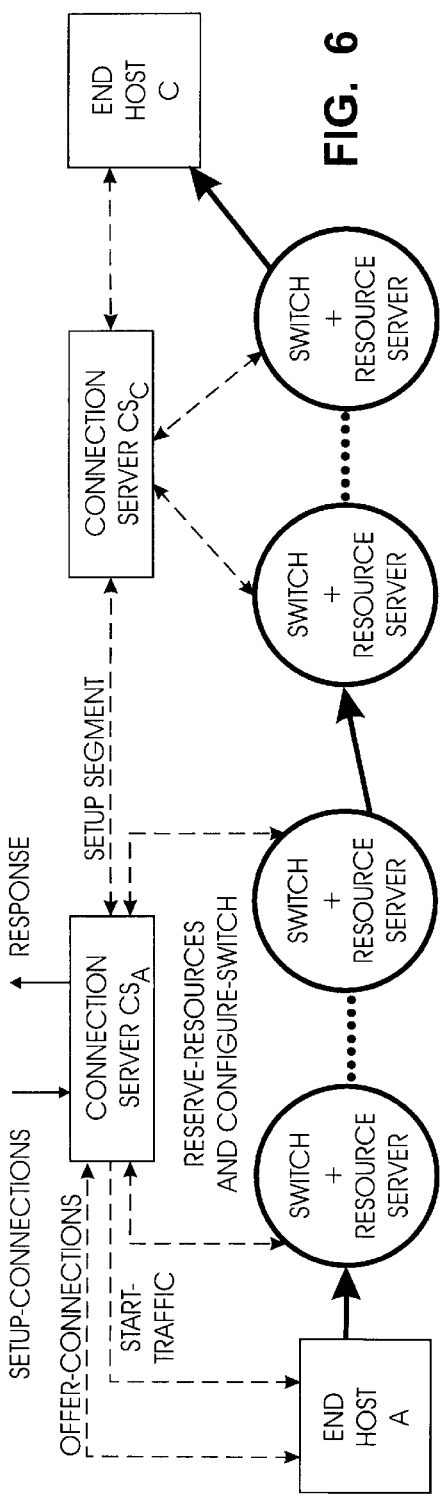
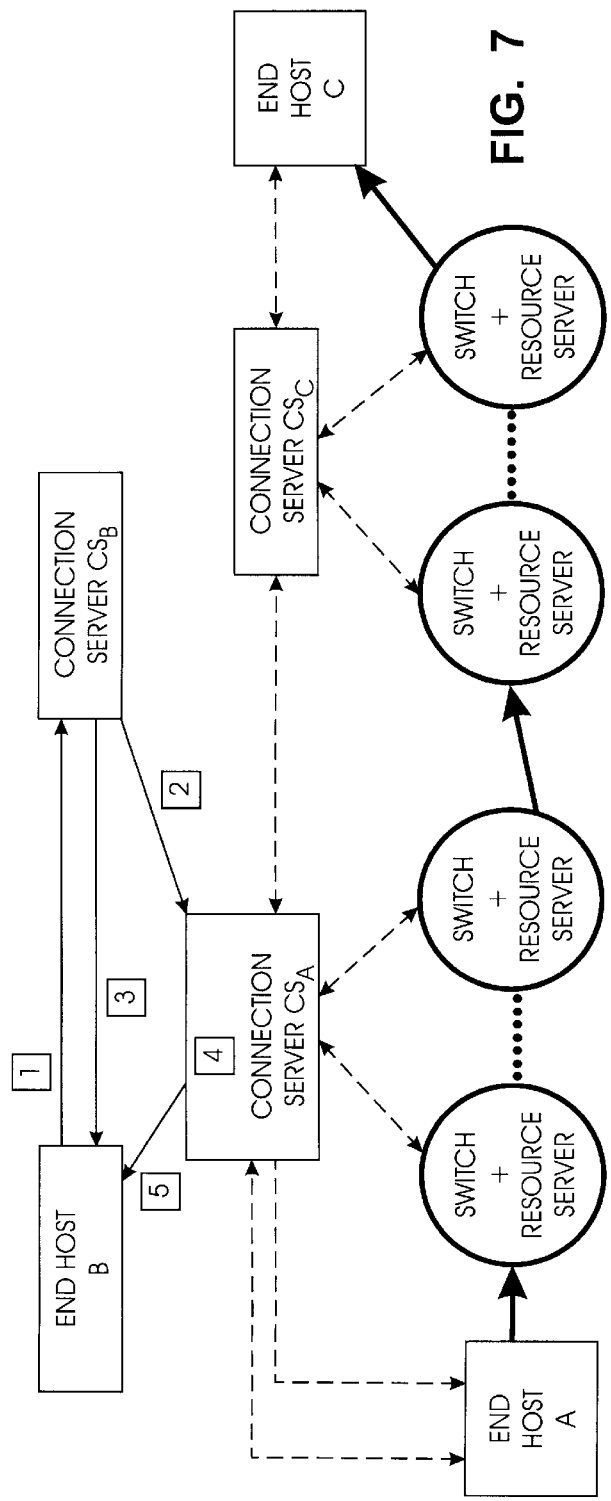

AAL: ATM ADAPTATION LAYER
SAR: SEGMENTATION AND REASSEMBLY
MID: MULTIPLEXING IDENTIFICATION

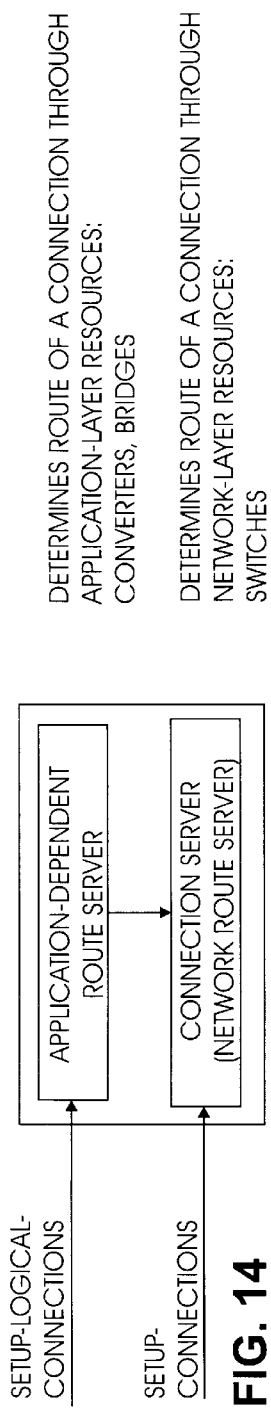
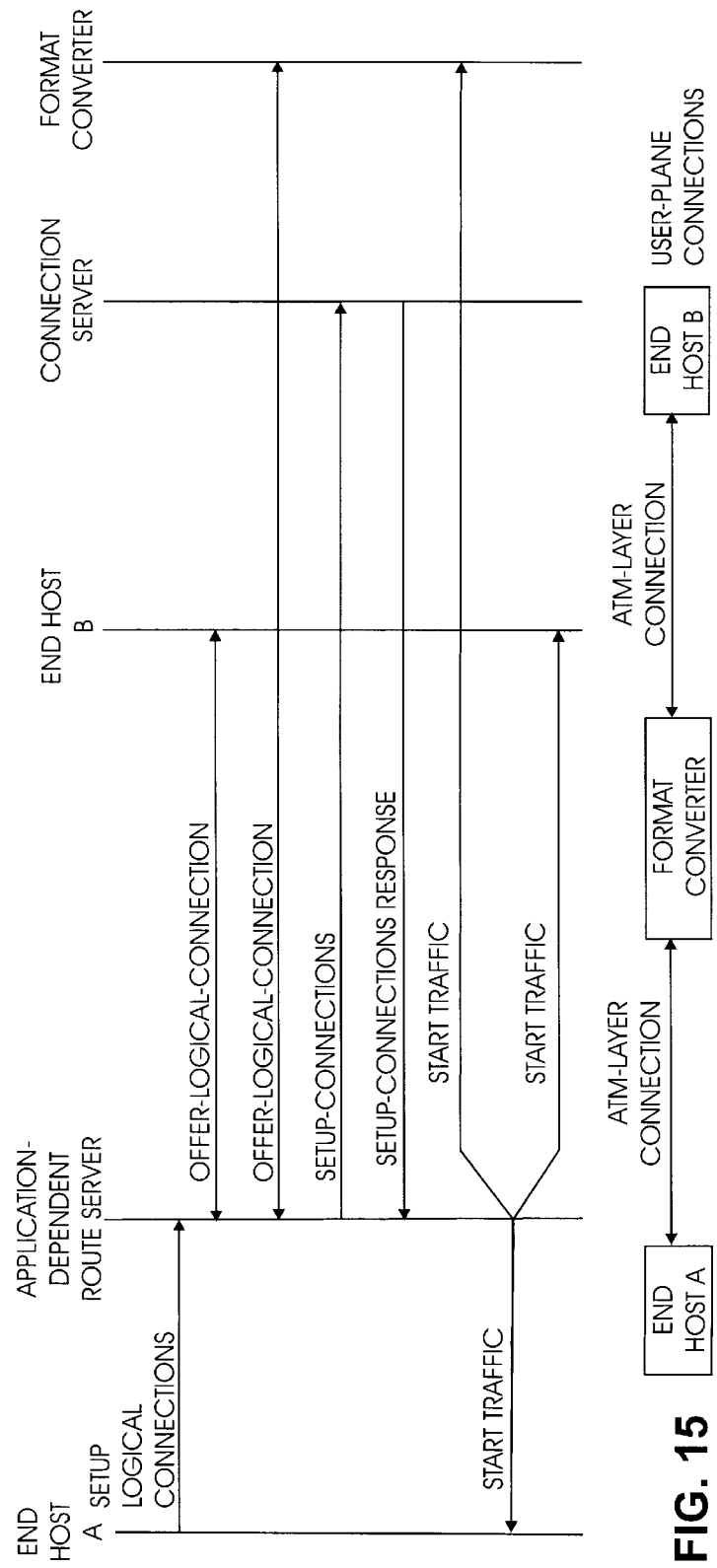

PARALLEL CONNECTION CONTROL

CROSS-REFERENCE TO RELATED APPLICATION

The present application is a continuation-in-part of Ser. No. 08/324,427 filed on Oct. 17, 1994 now U.S. Pat. No. 5,659,544 issued Aug. 19, 1997 entitled "METHOD AND SYSTEM FOR DISTRIBUTED CONTROL IN WIRELESS CELLULAR AND PERSONAL COMMUNICATION SYSTEMS" which is incorporated by reference herein in its entirety.

FIELD OF THE INVENTION

The present invention relates generally to improved methods and apparatus for parallel connection control, and, in a presently preferred embodiment, relates more particularly to a concurrent asynchronous transfer mode ("ATM") connection setup arrangement reducing the need for virtual path ("VP") processing.

BACKGROUND OF THE INVENTION

While the present invention is disclosed in the context of establishing ATM connection paths, it will be recognized that the problems addressed and the solutions provided by the present invention are also more generally applicable to other connection oriented networks.

Being a connection-oriented technology, ATM requires a connection establishment phase before user data exchange, and a connection release phase after completion of data exchange. The standard ATM connection process is based upon a hop-by-hop or switch-by-switch sequential threading connection setup scheme. A common approach used for decreasing end-to-end connection setup delay is to provision partial segments of connections a priori using virtual paths. However, capacity pre-allocated to these partial segments, called virtual path connections, are not shared across these segments. Ideally, although such an approach reduces sharing, it significantly reduces end-to-end connection setup delay. An attendant cost of the use of these virtual path connections is that higher network bandwidth and, thus, component costs are required. In view of the above, it would be highly desirable to achieve savings in bandwidth and resource costs while at the same time controlling setup delay.

SUMMARY OF THE PRESENT INVENTION

The present invention provides a new connection setup method and apparatus which address the above needs. The present invention allows savings in bandwidth obtained through sharing link resources, while at the same time controlling the connection setup delay. In a preferred embodiment, the approach is scalable and allows for robust network implementations.

The present invention provides reduced end-to-end connection delay using fewer pre-established virtual path connections than would be needed using the sequential hop-by-hop approach. Actions are preferably executed in parallel at sets of nodes, such as ATM switches, on the route of the connection. Thus, the present approach may suitably be called a parallel connection control ("PCC") approach.

Other features and advantages of the present invention will be readily apparent by reference to the following detailed description and accompanying drawings.

BRIEF DESCRIPTION OF THE DRAWINGS

FIG. 6 is a block diagram illustrating details of third-party connection setup message flow in accordance with the present invention;

FIG. 7 is a block diagram illustrating details of the routing of a third-party connection setup request in accordance with the present invention;

FIG. 14 illustrates a layered architecture suitable for allowing direct access by end hosts to both the logical control and network-layer connection control;

FIG. 15 illustrates details of a logical connection in accordance with the present invention;

DETAILED DESCRIPTION

Two principal approaches for ATM connection control presently exist, the ATM Forum approach for private ATM networks and the ITU-T approach for public ATM networks. These two approaches are described in detail in ATM Forum 95-0221R2, "Draft PNNI Signaling", Jun. 22, 1995, and ITU-T Broadband ISDN User Part (B-ISUP), Recommendations Q.2761, Q.2762, Q.2763, respectively. All of the above mentioned items are incorporated by reference herein in their entirety.

The two basic approaches are described more briefly below to provide context for the present invention. These approaches employ table-based and self-routing techniques which are described at length in C. Baransel, W. Dobosiewicz and P. Gburzynski, "Routing in Multihop Packet Switching Networks: Gb/s Challenge", IEEE Network Magazine, 1994, pp. 38–61, which is incorporated by reference herein.

In connection-oriented networks, such as ATM networks, routing procedures constitute the update of data, either routing information, or topology and status information, periodically in switches. This is a management plane procedure. Signaling is a control plane procedure which handles on-demand connection setup, modify and release requests. During connection setup, each switch consults the data updated by the routing procedure to determine the next switch or set of switches in the connection.

One approach for the routing procedure is that a network manager computes routes based on current loading conditions and possibly predicted call arrival and departure patterns. This typically involves periodically solving an optimization problem for some objective function, such as call blocking probability or network throughput, in order to determine routes through a network subject to a set of constraints. The routing data tables are then downloaded to the switches. These updates are usually performed in a quasi-static manner. When a signaling request for a connection setup arrives at a switch, it simply consults a routing table that was preloaded by the routing procedure to determine the next switch in the route. The ITU-T signaling standard for public ATM networks broadband ISDN user part ("B-ISUP"), assumes that the network employs such a routing procedure.

A second approach for the routing procedure is that defined by the ATM Forum for the private network node interface ("P-NNI"). Periodic topology state packets are exchanged between ATM switches. Each switch thus has network topology and current status information. When a signaling request for connection setup arrives at a switch, it uses the network topology and state information updated by the P-NNI routing protocol to select a set of switches through which to route the connection using an on-the-fly path determination algorithm, such as Dijkstra's shortest path algorithm. Hierarchical ordering of ATM switches, organized into peer groups, is used to allow this procedure to scale for large networks.

Figure 1:
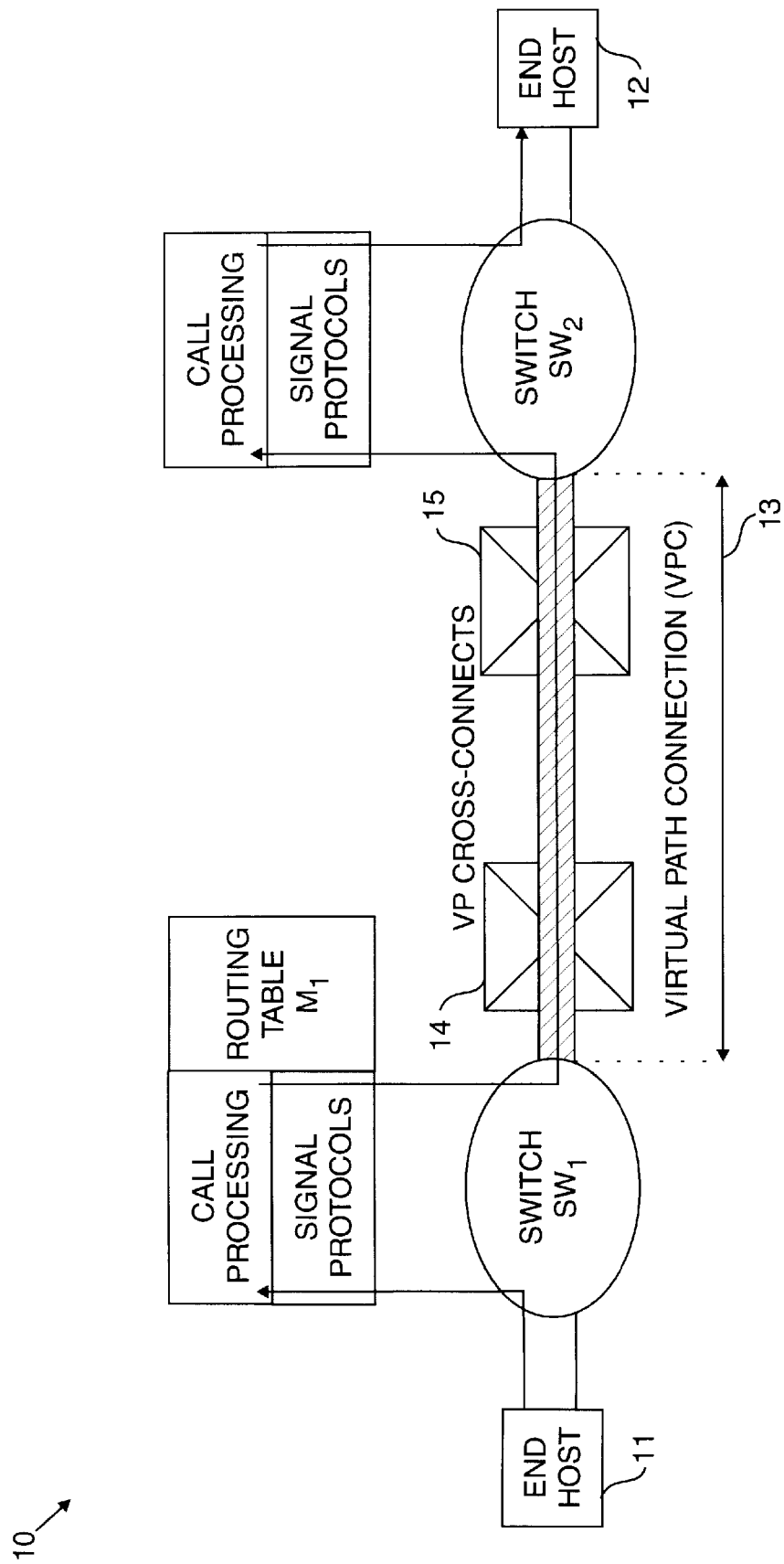
FIG. 1 is a block diagram illustrating a prior art switch-by-switch sequential approach for on-demand ATM connection setup.

Turning to FIG. 1, when an ingress switch, a switch that is connected to an end host that generates the incoming connection setup request message, such as switch $SW_1$ in network 10, receives a signaling request for the setup of an on-demand connection from an end host 11, it determines the route of the connection using one of the two approaches described above.

In the ITU-T B-ISUP signaling procedure, the optimal table-based routing scheme is employed. Based on the address of a destination party, such as end host 12, indicated in the connection setup signaling request, switch $SW_1$ determines the next switch in the route by consulting a routing table $M_1$, which maps each destination address, such as the address of the end host 12, to a next switch identifier. In FIG. 1, the next switch is $SW_2$ since the virtual path connection is treated as a pre-established logical link. Signaling messages are sent hop-by-hop with this operation being performed at each switch to determine the next switch through which to route the connection.

In the ATM Forum P-NNI signaling procedure, the shortest-path table-based routing scheme is employed. The ingress switch $SW_1$ computes a route of switches based on its local information about the current network topology and status by performing a generic connection admission control ("GCAC") and shortest-path algorithm. It forms a designated transit list ("DTL") of this set of switches. Signaling messages are sent hop-by-hop along this set of transit switches. In large networks, switches are arranged hierarchically in peer groups. In such networks, the DTL computed at an ingress switch consists of a full detailed path within the ingress switch's own peer group and less detailed paths within other peer groups in the connection. A border node in each subsequent peer group will determine the exact set of transit switches to route the connection through its peer group.

In both of these approaches, each switch in the connection performs the following actions:

Step 1. Connection Admission Control ("CAC") determines if the new connection can be admitted without disrupting any quality of service ("QoS") guarantees given to pre-existing connections. Bandwidth and other resource availability in the switch and on the link toward the next switch are checked.

Step 2. Selection of virtual path connection identifier ("VPCI")/virtual channel identifier ("VCI") or virtual path identifier ("VPI")/virtual channel identifier ("VCI") to the next switch on one of the interconnecting ATM interfaces.

Step 3. Making translation table entries to map port/VPI/VCI pairs from the incoming to outgoing ports in one or both directions. User plane ATM cells transported after the connection setup phase are routed through each switch by consulting these port/VPI/VCI translation tables.

Step 4. Setting of control parameters for scheduling and other run-time algorithms, such as rate-control, priority control, usage parameter control, and fault handling, in the switch.

Steps 3 and 4 may be performed as signaling proceeds in the forward direction or when the response signaling messages travel in the backwards direction.

Upon completion of these activities, a signaling message is sent to the next switch on the route. This is identified from table $M_1$ in public networks, or from the DTL specified in the incoming signaling message in private networks. At each switch on the route, the above listed four steps are performed. The last switch in the connection may be required to perform an additional function, an end-to-end QoS computation, if QoS measures, such as end-to-end delay, are part of the connection request. Henceforth, we refer to these two standard approaches for private and public networks for on-demand connection setup using the generic term "switch-by-switch sequential approach" since they are basically very similar.

In order to minimize the number of switches at which the P-NNI and B-ISUP signaling procedures are performed sequentially, partial segments of connections are pre-established using virtual path connections (VPCs) such as VPC 13 shown in FIG. 1. During on-demand connection setup, no signaling procedures are executed at the VP cross-connects 14 and 15. Switch $SW_1$ selects a VCI within the VPC shown terminating at switch $SW_2$ and sends the next-hop signaling message directly to switch $SW_2$. This technique of using VPCs reduces the number of nodes at which connection setup messages need to be processed, thus reducing end-to-end connection setup delay. However, it sacrifices network utilization, reduces sharing and, hence, the benefits of statistical multiplexing as addressed further below.

The effects of pre-establishing or provisioning VPCs on network resources, such as bandwidth, have been analyzed. As a result of this analysis, it has been determined that consistent with a given blocking probability criterion, significant savings in the minimum required system bandwidth can be achieved if the number of provisioned virtual path connections can be reduced. This beneficial result holds true even where an exact characterization of traffic patterns is known a priori.

This analysis demonstrates that, while planning end-to-end routes for multiple streams of the same service class, by using more common links that are shared than a completely partitioned set of routes, fewer network resources are needed to achieve a specified call blocking probability. Alternatively, one can achieve lower call blocking probability for a given set of resources in networks that use fewer provisioned virtual path connections.

Given these results, a network designer should minimize the usage of pre-established virtual path connections (VPCs) that reduce sharing. However, if the usage of pre-established VPCs is minimized, and the switch-by-switch sequential approach described above is used for on-demand connection setup, the end-to-end connection setup delay will be high. This delay occurs because switch configurations have to be made at each transit node that is not pre-configured with a virtual path connection.

The present invention provides an alternative approach to connection setup. That approach exploits parallelism to achieve reductions in end-to-end connection setup delay thus minimizing the number of pre-established virtual path connections needed. Instead of performing functions sequentially at each switch, groups of per-switch functions are executed concurrently at multiple switches. The present invention does not recommend a solution in which provisioned virtual path connections are completely abandoned. Instead, by employing a mixture of virtual path connections and VC routing data tables, one can design a network in accordance with the principles of the present invention in which utilization is not sacrificed in favor of end-to-end connection setup delay.

Figure 2:
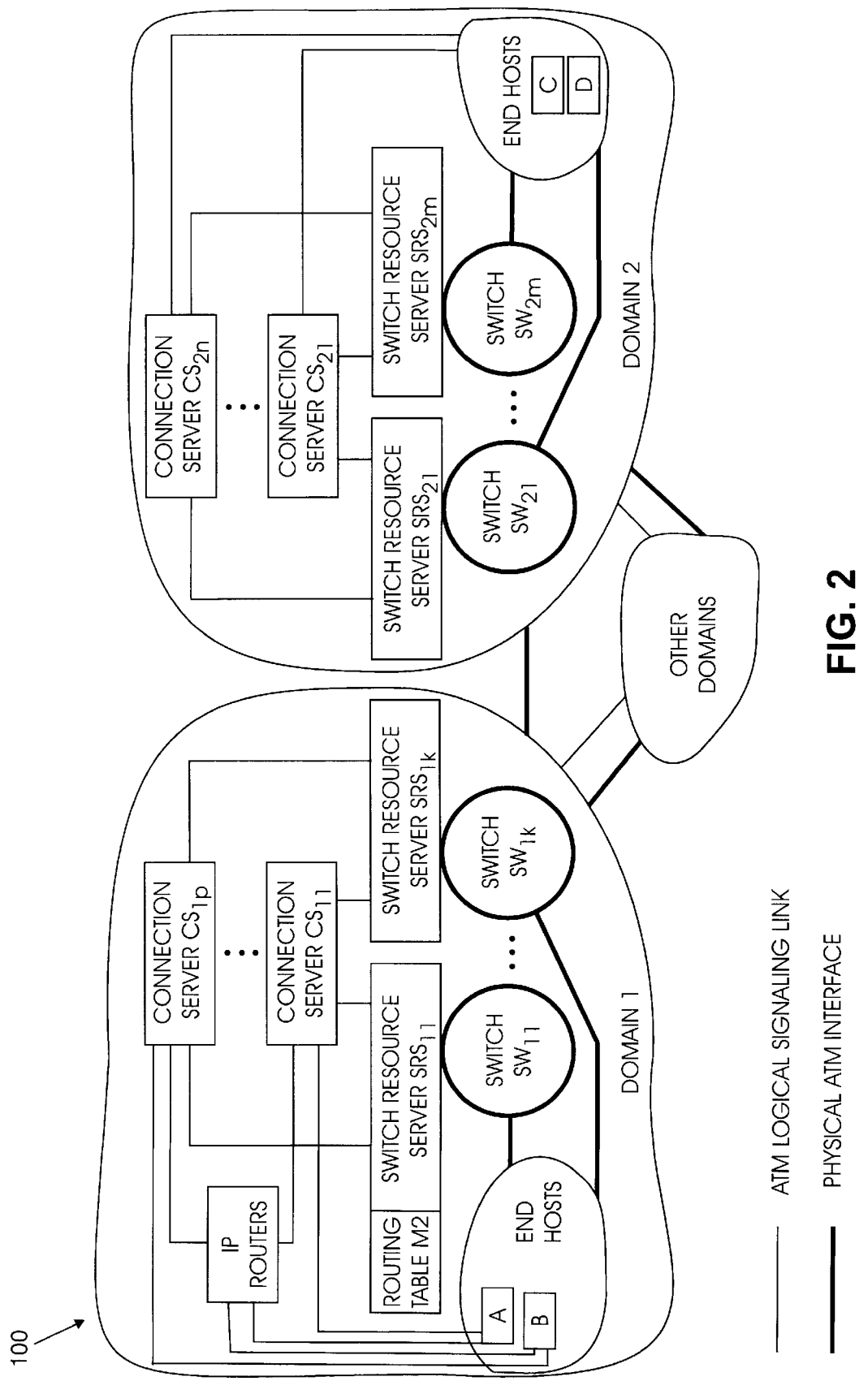
FIG. 2 is a block diagram of a PCC network architecture in accordance with the present invention.

The present invention provides a network architecture and parallel connection control ("PCC") approach to reducing the number of VPCs consistent with achieving a suitably fast connection. FIG. 2 shows an overall network architecture 100 in accordance with the present invention.

In the network shown in FIG. 2, the functions of setting up, modifying, and releasing a connection are split between two types of servers, connection servers and switch resource servers. Connection servers $CS_{1p} \ldots CS_{11}, CS_{2n} \ldots CS_{21}$, perform route determination, and end-to-end or segment quality of service computation where a segment is defined as a concatenation of channels on a connection. Switch resource servers, such as the servers $SRS_{11}, \ldots SRS_{1k}$, $SRS_{21}, \ldots$ and $SRS_{2m}$, manage switch resources, such as VPI/VCIs on all the ATM interfaces to the switch, $SW_{11} \ldots SW_{1k}$, $SW_{21} \ldots SW_{2m}$, respectively with which it is associated, link bandwidth, buffer space, and the like and performs fabric control functions to make and clear port/VPI/VCI translation table entries in the switch. User plane ATM cells transported after the connection setup phase are routed through each switch by consulting these port/VPI/VCI translation tables.

The switch resource servers also set parameters for the various run-time processes, such as priority control, usage parameter control, rate control, scheduling, and fault handling, for example, based on the QoS parameters specified for the connection. FIG. 2 shows one switch resource server per ATM switch, although other ratios of servers to switches could be employed.

FIG. 2 shows that the network 100 is subdivided into "domains", domain 1 and domain 2. Each domain consists of a set of connection servers, a set of switches with switch resource servers and a set of end hosts A,B and C,D. Each connection server in a domain is logically connected to all the switches in the domain and to some subset of end hosts which are physically connected to this set of switches. For example, domain 1 includes p connection servers, $CS_{11}, \ldots, CS_{1p}$, k switches, $Sw_{11}, \ldots, SW_{1k}$ with associated switch resource servers $SRS_{11}, \ldots, SRS_{1k}$, and a group 110 of end hosts A,B. It will be understood that the end hosts A,B and C,D are representative of what will typically be a much larger number of end hosts with two being shown in each domain solely for ease of reference. Further, domains may be heterogeneous, in that different domains may have different numbers of switches, connection servers, and end hosts.

In FIG. 2, the signaling links shown between the end hosts and the connection servers, between the connection servers and switch resource servers, and between connection servers from one domain to another, are assumed to be ATM logical links used only to carry signaling messages. It is also assumed that each end host has a direct ATM signaling logical link to only one connection server. This is termed the primary connection server of the end host. In general, however, an end host may have as many signaling links to different connection servers as is required from a performance and reliability standpoint. Other connection servers within the same domain as the end host act as its alternate connection servers. Every connection server in a domain has routing information to route segments of connections within this domain. Thus, any incoming connection request to an end host can be handled by its primary or any of its alternate connection servers.

For signaling communication between any two nodes that do not have a direct ATM logical link, datagram communication through one or more routers can be used. For example, a parallel connection control protocol ("PCCP") message exchange between two nodes without an ATM signaling logical link is accomplished using IP over ATM, where the message is routed through IP routers. This approach is similar to the approach used inside SS7 networks, where two nodes that need to exchange a signaling message, but that do not have a direct link, use message transfer part level 3 "NTP L3" datagram packets to route messages through routers called signaling transfer points ("STPs").

One presently preferred PCC algorithm for establishing two-party bidirectional connection is described below in the context of a more general procedure for connection setup spanning multiple domains, such as from end host A to end host C in FIG. 2. The intra-domain connection setup procedure is a subset of this general procedure.

Figure 3:
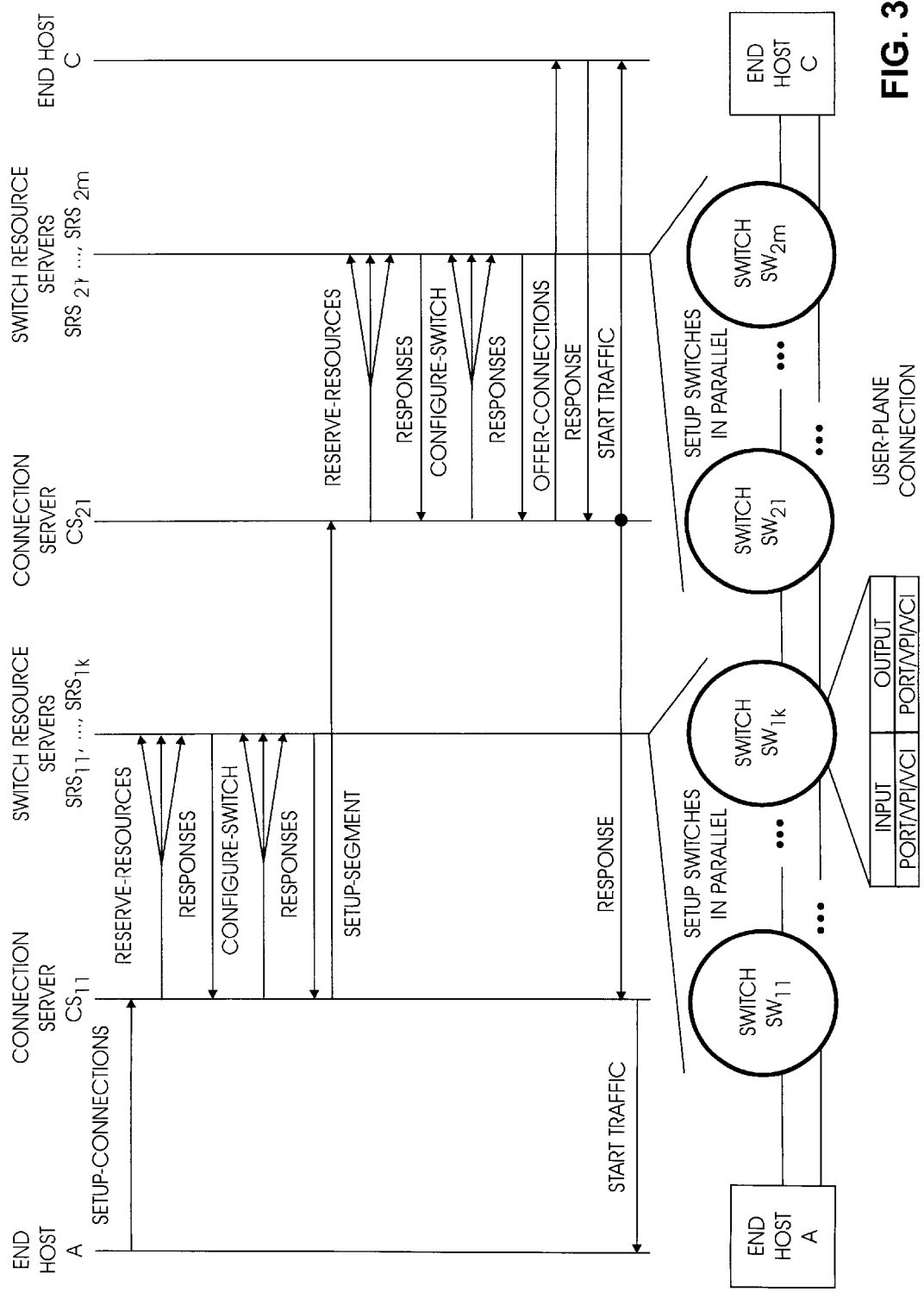
FIG. 3 is a message flow diagram illustrating two-party connection setup in accordance with the PCC approach of the present invention.

FIG. 3 shows the message exchange needed to set up a connection between two end hosts, such as end host A to end host C in the network of FIG. 2, that involves multiple connection servers. The first connection server $CS_{11}$ that receives the Setup-connections message determines the route of the connection as passing through switches in its domain 1 and through domain 2. It establishes the first segment of the connection through switches in its domain using a two-phase message exchange as shown in FIG. 3. In the first phase, it requests the switch resource servers of the switches on the route within its domain to reserve resources for the connection. This phase is executed in parallel at all the switches within this domain through which the connection is routed. Each switch performs connection admission control (CAC) procedures and selects VPI/VCIs as described above.

If this first phase is successful, the connection server $CS_{11}$ initiates the second phase in the switch resource servers to configure the switches. This phase is also executed in parallel at all the switches in domain 1. Each switch makes port/VPI/VCI translation table entries and sets parameters for run-time algorithms as described in steps 3 and 4 above. Upon successful completion of this phase, the segment through the first domain is fully established. Thus, a first connection segment is established in a first domain by setting up a first plurality of swithches in parallel. The first connection server $CS_{11}$ then requests the connection server $CS_{21}$ in the next domain to set up its segment of the connection. This uses the same two-phase procedure of reserving resources and configuring switches. Thus, segment-by-segment setup proceeds sequentially until the called end host C is reached. However, within segment, switch resource servers perform the per-switch setup functions in parallel.

Before describing further details of the procedure, we discuss how this procedure achieves the goal of end-to-end connection setup delay reduction with minimal pre-established virtual path connections. Consider, for example, that the end-to-end connection setup delay requirement is 500 ms and that the per-switch processing time is 100 ms in the switch-by-switch sequential approach of the prior art. Thus, using that approach, the connection can be routed through at most 5 switches. If we further assume that physical connectivity is such that there are 20 switching fabrics between the two end hosts A and C, then 15 of the switching fabrics should be designated ATM VP cross-connects. Thus, resources need to be pre-assigned for virtual path connections passing through these 15 VP cross-connects, which reduces sharing of the system resources considerably.

Using the PCC approach, we assume that a connection server can set up a segment passing through 5 switches in 150 ms. This time is only slightly larger than the per-switch processing time of 100 ms assumed for the switch-by-switch sequential approach because the per-switch functions are performed in parallel at the 5 switches in the segment. An extra 50 ms were added for the signaling message communication times needed to support the inventive two-phase approach. Using this 150 ms assumption for the PCC approach, the connection can be routed through a maximum of 3 domains to meet the end-to-end connection setup delay requirement of 500 ms. Assuming each domain has the same number of switches (five), the total number of switches at which per-node configuration occurs during on-demand connection setup is 15. This implies that only 5 VP cross-connects are needed. Thus, resources need to be pre-assigned for virtual path connections passing through only these 5 VP cross-connects, instead of the 15 cross-connects that were needed using the switch-by-switch sequential approach. This leads to increased sharing of resources in the PCC approach and, hence, better network utilization or lower network costs.

Figure 4:
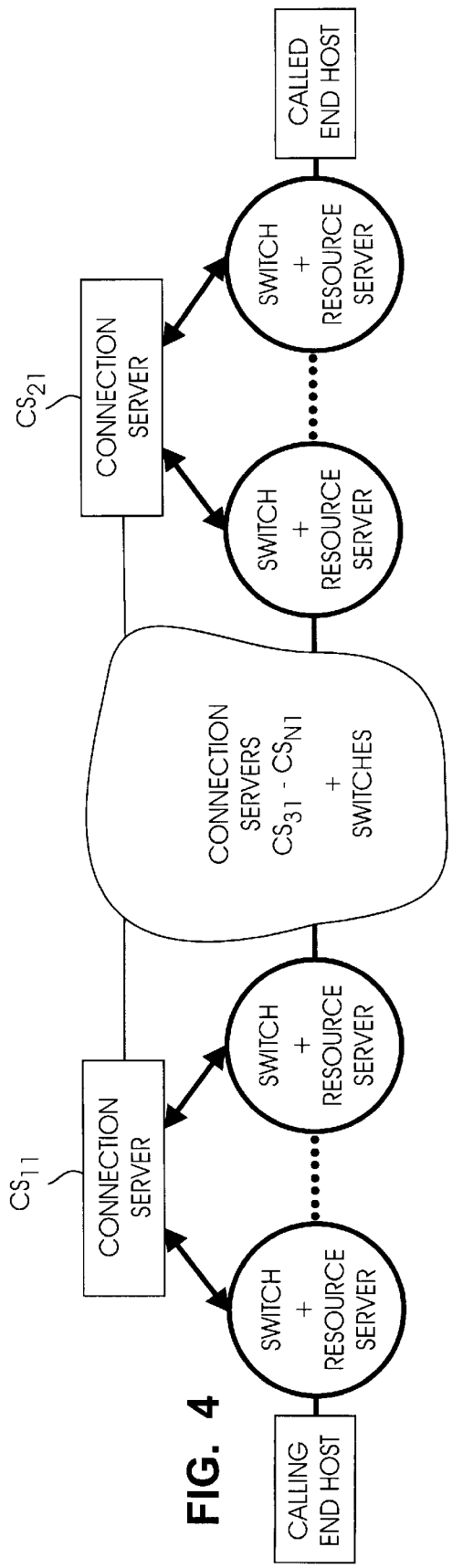
FIG. 4 is a block diagram of a general network configuration for setting up a PCC connection in accordance with the present invention.

Further details of this procedure are now provided. The flow shown in FIG. 3 assumes that the end-to-end connection between the end hosts A and C is routed through switches $SW_{11}, \ldots, SW_{1k}$ in domain 1 and then through switches $SW_{21}, \ldots, SW_{2l}$, in domain 2. Further, it assumes that connection server $CS_{11}$ is the connection server that handles the setup of the segment through domain 1 and $CS_{21}$ is the connection server that handles the setup of the segment through domain 2. Since switch $SW_{1k}$ is assumed to be physically connected to switch $SW_{21}$, only connection servers $CS_{11}$ and $CS_{21}$ are involved in this connection setup procedure. In general, the connection may pass through several domains, and hence, several connection servers $CS_{31}$–$CS_{N1}$ may be involved to connect up multiple segments as shown in FIG. 4.

When the connection server $CS_{11}$ receives a Setup-connections message from end host A as shown in FIG. 2, it performs the route determination function using either the above described table-based approaches. Thus, an optimal table-based routing approach can be used in conjunction with the connection setup signaling procedure. The routing table assumed at the connection server is slightly different from table $M_1$ defined above. Such a routing table $M_2$ located at $CS_{11}$ maps the combination of the source and destination end hosts to a sequence of switches within the domain of $CS_{11}$ and the identity of a connection server in the next domain through which the connection must be routed. Alternative routes may be pre-stored in $M_2$ as was possible with $M_1$.

With the shortest-path table-based routing approach, server $CS_{11}$ executes the generic connection admission control ("GCAC") and shortest path algorithm using the current network topology and state information to determine the set of ATM switches and other connection servers needed for the end-to-end-route. Thus, $CS_{11}$ is similar to the ingress switch in a P-NNI-based network which computes the designated transit list ("DTL") for the connection. In P-NNI-based networks, the DTL computed at an ingress switch consists of a full detailed path within the ingress switch's own peer group and less detailed paths within other peer groups in the connection. Similarly, in the network 100, the DTL computed at $CS_{11}$ will consist of a set of switches within the domain of $CS_{11}$ and a set of connection servers through whose domains the end-to-end route will pass.

Using either approach for the exemplary message flow of FIG. 3, the end-to-end route is determined as consisting of switches $SW_{11}, \ldots, SW_{1k}$ in domain 1 and as passing through the domain of connection server $CS_{21}$.

Figure 5:
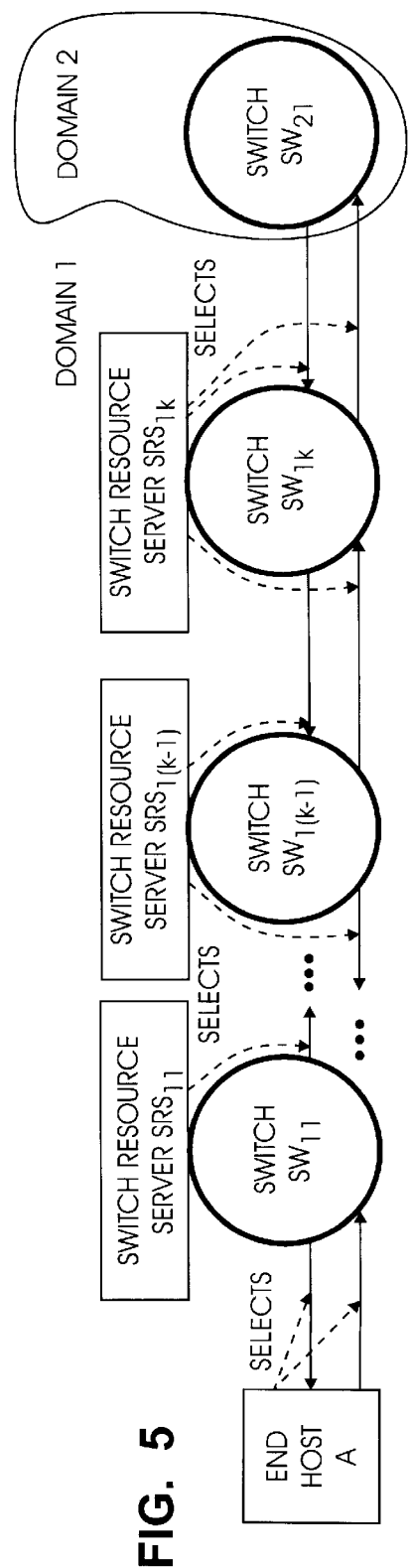
FIG. 5 is a block diagram illustrating details of how channels are selected in setting up a PCC connection in accordance with the present invention.

Having determined the set of switches through which to route the connection within its domain, the connection server sends Reserve-resources messages in parallel to the switch resource servers of these switches as shown in FIG. 3. Further details with respect to the selection of the VPI/VCIs, performed at the switch resource server, are illustrated in FIG. 5.

In this regard, we assume that the end host A had selected VPI/VCIs on its user-network interface and specified these in the Setup-connections message. In the Reserve-resources message, connection server $CS_{11}$ specifies that:

The first switch resource server in domain 1, $SRS_{11}$, selects VPI/VCIs in the direction from its switch $SW_{11}$ to the next switch $SW_{12}$;

intermediate switch resource servers, $SRS_{12}, \ldots, SRS_{1k-1}$, select outgoing VPI/VCIs in both directions from their associated switches; and the last switch resource server in domain 1, $SRS_{1k}$, selects a VPI/VCI from $SW_{1k}$ to $SW_{1(k-1)}$ and VPI/VCIs in both directions on the ATM interface between $SW_{1k}$ and the switch in the next domain, $SW_{21}$.

It will be recognized that other VPI/VCI selection approaches may be followed.

Upon completion of the CAC and VPI/VCI selection functions in the reserve-resources phase, each switch resource server asynchronously sends its response to the Reserve-resources message to $CS_{11}$ as shown in FIG. 3. Parameters of this response include switch-level QoS guarantees that can be provided by the switch, such as cross-switch delay, and the requested VPI/VCIs. The connection server computes any segment-level QoS parameters. If user QoS specifications for the connection are not violated, the connection server $CS_{11}$ forms the Configure-switch messages and sends them in parallel to the switch resource servers as shown in FIG. 3. The connection server specifies the input and output VPI/VCIs with port numbers needed to configure each switch fabric in each Configure-switch message. This VPI/VCI data is obtained from the Reserve-resources responses that were received in the previous phase. For example, the VPI/VCI from $SW_{1(k-1)}$ to $SW_{1k}$ (see FIG. 5) returned in the Reserve-resources response message from $SRS_{1(k-1)}$ is the input channel and the VPI/VCI from $SW_{1k}$ toward $SW_{21}$, which was returned in the Reserve-resources response from $SRS_{1k}$, is the output channel in the configuration (translation table entry) needed in $SW_{1k}$ to support one direction of the connection within this switch.

As described earlier, the actions taken in parallel at the switch resources servers, $SRS_{11}, \ldots, SRS_{1k}$, upon receiving the Configure-switch message, are steps 3 and 4 described above. These include making port/VPI/VCI translation table entries and setting parameters for user plane run-time algorithms in the corresponding switches.

Configure-switch response messages are then sent asynchronously from these switch resource servers to the connection server. Upon receiving all of these responses, the connection server, $CS_{11}$, sends a Setup-segment message to the connection server in the next domain, $CS_{21}$, as shown in FIG. 3. The VPI/VCIs selected for the two directions on the ATM interface between switches at the edge of these domains, $SW_{1k}$ and $SW_{21}$, as shown in FIG. 5, are passed as parameters in this message.

Upon receiving the Setup-segment message, the connection server $CS_{21}$ determines the route for its segment of the connection. In this example, the segment route consists of switches $SW_{21}, \ldots, SW_{2m}$. The two phases for reserving resources and configuring switches are performed. Actions for each phase are executed concurrently at the switch resource servers $SRS_{21} \ldots, SRS_{2m}$ associated with these switches. Upon successful setup of this segment, server $CS_{21}$ offers the connection to the end host C with the VPI/VCIs for the two directions on the interface between switch $SW_{2m}$ and end host C.

If the end host C accepts the connection, it notifies its application to enable reception of data on the incoming channel. Upon receiving the Offer-connections response, server $CS_{21}$ can send the Start-traffic to end host C, as shown in FIG. 3, since the entire previous segment from end host A, including end host application configuration for data reception, is already established. Server $CS_{21}$ also sends a Setup-Segment response to connection server $CS_{11}$ which can then send a Start-traffic message to end host A allowing it to start data transfer.

Thus, connection setup proceeds on a segment-by-segment basis across multiple domains, while setup functions at switches within each domain are executed concurrently.

It should be noted that an end application may require that, as part of setting up a connection, the network guarantees synchronization between the transmitting and receiving ends of a connection. In other words, the transmitting end should not be allowed to send traffic without having ensured that the receiving end is ready to receive data. To handle such a requirement, one of two approaches may be applied. The Setup-connections message may carry VPI/VCI assignments for the two directions of the interface from end host A to switch $SW_{11}$, in which case the application at the end host is configured to receive data on these ATM channels. If the Setup-connections message does not specify the VPI/VCIs from/to the calling end host A which may happen, if, for instance, the UNI signaling standard messages are used between the end host and the connection server instead of the messages shown in FIG. 3, as the connection identifier parameter, specifying the VPCI/VCI or VPI/VCIs, is not mandatory in the UNI SETUP signaling message from an end host to a switch, then switch resource server $SRS_{11}$ selects these channels as part of the reserve-resources phase for the first segment.

In this case, the identifiers of these channels must be communicated to the end host A during the configure-switch phase of the first segment setup so that upon completion of the latter procedure, the first segment of the connection through domain 1 is fully established including the calling end host A application configuration. Thus, when connection server $CS_{21}$ receives the Setup-segment message, it is assured that the previous segment is fully established including end host application configuration for data reception, permitting it to send the Start-traffic message to its host C.

The P-NNI routing protocol is especially synergistic with the PCC approach for the connection setup signaling procedure. Having computed a DTL of switches through which to route a connection, the P-NNI signaling procedure performs the per-switch setup functions sequentially. Instead, using the present approach, concurrent setup is done at switches within a peer group identified in the DTL. Furthermore, in situations requiring crankback for failed setups, the P-NNI signaling procedure only allows nodes that inserted DTLs to compute alternate ones. This requires rerouting the call back along the path that was followed to the node in which the setup failed back to the last node to insert a DTL. Instead, in the PCC approach, if the reserve-resources phase failed at any one of the switches, there is no sequential back-tracking. The connection server can immediately re-try the reserve-resources phases using a new route avoiding the switch at which the reserve-resources failed.

The PCC algorithm may be implemented in large-scale networks with high reliability and availability requirements. This scalability and reliability contrasts favorably with a centralized scheme such as may be implemented via network management interfaces. In the PCC approach, switch resource servers manage all the resources of a switch. Simple writes to its databases are not permitted. Instead, the switch resource servers have the intelligence to decide whether or not to admit a connection by performing CAC and selecting VPI/VCIs themselves. This permits network configurations in which multiple connection servers can be used in conjunction with the same set of switches and associated switch resource servers. For example, in FIG. 2, multiple connection servers $CS_{11}, \ldots, CS_{1p}$ located in domain 1 have the same routing data to perform route determinations for segments of connections that pass through this domain. Since switch resource servers set aside resources for a connection during the Reserve-resources phase of the setup procedure, no conflicts for resources or race conditions arise by allowing multiple connection servers to communicate with the same switch resource server.

Multiple connection servers within a domain serve to improve scalability and reliability. Different end hosts within a domain can be connected to different connection servers via ATM logical signaling links, thus load balancing the processing associated with handling connection requests from these end hosts. For example, in FIG. 2, connection servers $CS_{11}$ and $CS_{21}$ may be involved in the setup of a connection from end host A to end host C. Simultaneously, connection servers $CS_{12}$ and $CS_{22}$ may be involved in the setup of a connection from end host B to end host D. For every connection, multiple connection servers may be involved, one for each domain through which the connection passes.

Failure conditions can be handled by connection servers within a domain acting as backups for each other. Routing data corresponding to any end host H (not shown) in any connection server in a domain other than the domain of end host H indicates the identities of the primary and alternate connection servers of end host H. Thus, during incoming connection setup to end host H, if its primary connection server is nonfunctional, the connection can be set up using any of its alternate connection servers. Thus, the PCC approach is robust.

The number of connection servers needed per domain can be derived from performance models or measurements or some combination of both. Since switch hardware capacities may grow at a different rate from processing capacities needed in servers associated with switches, by decoupling the connection server functionality from the switch, network planners will have more flexibility. A network can be grown independently in terms of the number of connection servers and number of ATM switches needed.

In further aspects of the present invention, the PCC technique may be utilized to handle the more complex tasks of network-layer connection control or bearer control. The scenarios described below deal with network-layer connections or, in other words, connections routed strictly through ATM switches.

First, a third-party connection setup scenario is described. Most commonly, an end host that needs to exchange data with some other end host requests a connection itself. However, in ATM networks, it is anticipated that an end host, such as a user or server, may request the setup of a connection between two or multiple other end hosts. For example, a conferencing application server may request a connection from an end host to a video bridge. With separation of call and connection control, a call management entity in the network may request a connection between two end hosts.

FIG. 6 shows the message flow for a third-party bidirectional connection setup request in accordance with the present invention. Upon receiving the third-party Setup-connections request, the primary or alternate connection server $CS_A$, of end host A, first offers the connection to end host A. If accepted, connection server $CS_A$ determines the route of the connection and performs the Reserve-resources and configure-switch phases by communicating with the switch resource servers within its domain. The Offer-connections message to end host A may be sent after the Reserve-resources phases if VPI/VCIs on the UNI to end host A are to be selected by the network as described above. Upon completing the setup of its segment of the connection, the server $CS_A$ sends a Setup-segment message to the next connection server in the route toward end host C. Subsequent message flow is similar to that previously described for bidirectional two-party connection setup. Upon receiving the Setup-segment response from server $CS_C$, the server $CS_A$ sends the Start-traffic message to end host A as shown in FIG. 6. Then, server $CS_A$ responds to the original Setup-connections request.

Next, details of how the third party connection setup request is routed to a connection server of one of the end hosts on the connection are described. FIG. 7 shows a scenario in which end host B issues a request (step 1) for a connection from end host A to end host C. This request is sent to one of its connection servers (primary or alternate) $CS_B$. If we assume that the three end hosts A, B, and C, are in different domains, server $CS_B$ simply forwards the request (step 2) to either one of the two servers, $CS_A$ or $CS_C$ assuming that the identity of this server is readily determined by the server $CS_B$. In FIG. 7, we assume this server is $CS_A$. Server $CS_B$ then sends the datagram address of the selected connection server $CS_A$ to end host B (step 3). This allows any further communication regarding this connection to pass directly from connection server $CS_A$ to end host B. Connection server $CS_B$ drops any record of this connection. Thus, while server $CS_A$ may receive the third-party connection setup request from server $CS_B$, after completing connection setup (step 4, which includes all the detailed steps shown in FIG. 6), it sends the response directly to end host B (step 5), the original requester of the third-party connection setup. This communication occurs using datagram packets since server $CS_A$ and end host B are in different domains and are hence not interconnected by a direct ATM logical link.

In order for connection server $CS_B$ to determine the identity of the connection server of one of the end hosts in the connection ($CS_A$ or $CS_C$), one of multiple techniques can be used. Geographical addressing can be used as in telephony networks where the address of an end host indicates the identities of its connection servers (primary and alternate). Another approach is to use the routing data in connection servers to sequentially route the signaling message until it reaches $CS_A$ or $CS_C$. Other schemes using domain name service are also possible. The domain name service scheme can be used by either connection server $CS_B$ or by the end host B itself.

The setup of a connection with one sending node and multiple receiving nodes is also addressed by the present invention. The request may be originated from the sending node, one of the receiving nodes, or in general, by any node using a third-party connection setup request. Two procedures, one for a request originated by the sending node, and the other for a request originated by the receiving node are described below. The latter illustrates a problem of synchronization that may arise between the data sending node and the receiving node. A third-party request for such a connection is relatively straightforward to construct.

Figure 8:
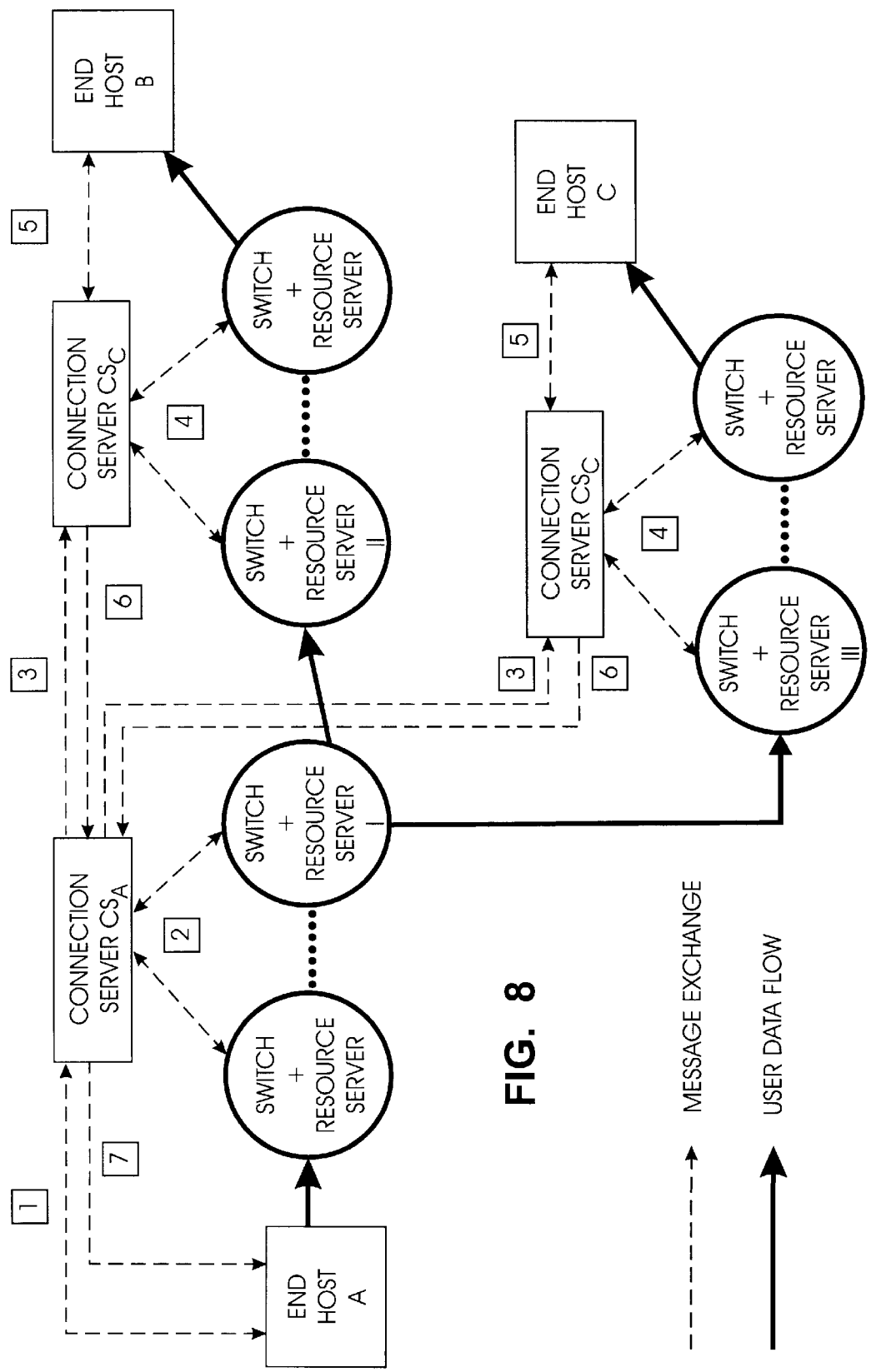
FIG. 8 is a block diagram illustrating details of a unidirectional multicast connection setup in accordance with the present invention.

FIG. 8 shows the steps involved in setting up a unidirectional multicast connection from end host A to end hosts B and C. This procedure is a relatively straightforward extension of the PCC approach described above for two-party connection setup. Upon receiving the Setup-connections request (step 1), connection server $CS_A$ determines the route for the connection. For the configuration shown in FIG. 8, this route consists of a set of switches within its domain, connection server $CS_B$ to reach end host B, and connection server $CS_C$ to reach end host C. In general, there are many configurations for the route determined in this phase: all end hosts A, B, and C, may be within the domain of one connection server, any combination of two end hosts may share a connection server, multiple domains (connection servers) may be present between the domains (connnection servers) of the end hosts, etc. The message flow for these configurations may be slightly different from the one shown in FIG. 8, but can be readily drawn.

Connection server $CS_A$ completes the Reserve-resources and Configure-switch phases (step 2) for its segment of the connection. Since the multicast point is at switch $SW_1$ in FIG. 8, $CS_A$ requests the switch resource server $SRS_1$ of the corresponding switch to allocate multicast VPI/VCIs on the interfaces to the two switches, $SW_{11}$ and $SW_{111}$. In general, the switch at which the multicast point is selected may be in the domain of a connection server different from that one and host A.

$CS_A$ sends Setup-segment messages (step 3) to the connection servers, $CS_B$ and $CS_C$, simultaneously. The VPI/VCIs selected on the two links emerging from the multicast point are included as parameters in the corresponding Setup-segment messages. The Reserve-resources and Configure-switch phases (step 4) are executed by servers $CS_B$ and $CS_C$ for their segments of the connection. These servers send Offer-connections messages (step 5) to their respective end hosts. No Start-traffic messages are sent to the end hosts B and C, since end hosts B and C are only receiving nodes in the connection. Setup-segment responses (step 6) are generated back to connection server $CS_A$, which then generates a Start-traffic message (step 7) to its end host A. This completes the setup of a unidirectional multicast connection where the setup requesting end host is the sending node.

As an example of an end host requesting a unidirectional multicast connection in a receiving node, consider a setup-connections request from end host A for a unidirectional multicast connection B→A, C. This scenario illustrates a possible synchronization problem that may arise between the data sending node and the receiving node. A solution for the PCC approach follows.

The message flow is similar to that described above for the A→B, C connection. After setting up its segment of the connection, server $CS_A$ sends the Setup-segment message to the servers $CS_B$ and $CS_C$. As part of setting up its segment, if server $CS_B$ sends a Start-traffic message to end host B which is needed here since B is a sending node, then end host B may start sending traffic before one of the receiving nodes, for example, end host C, is ready to receive. In order to handle this situation, a parameter is defined in the Setup-segment message which indicates whether or not the Start-traffic message should be sent after completion of segment setup if an end host is part of the segment. In this example, server $CS_A$ will select the no-start-traffic option in the Setup-segment message which it sends to connection server $CS_B$. Connection server $CS_B$ completes setup of its segment and returns a Setup-segment response to server $CS_A$. This assures server $CS_A$ that end host C is ready to receive data. Connection server $CS_A$ then sends the Start-traffic message directly to end host B. Since server $CS_A$ has no direct logical link to end host B (being in a different domain), it uses datagram packets to send this message.

An alternative to this approach is to simply route the connection setup request received by connection server $CS_A$ to a primary or alternate connection server of the sending end host $CS_B$, as was done with third party setup.

Figure 9:
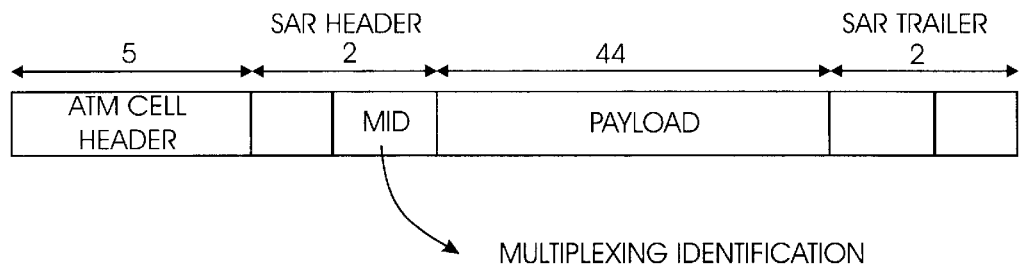
FIG. 9 illustrates a prior art ATM cell for an ATM adaptation layer ("AAL") type 3/4 data packet.
Figure 10:
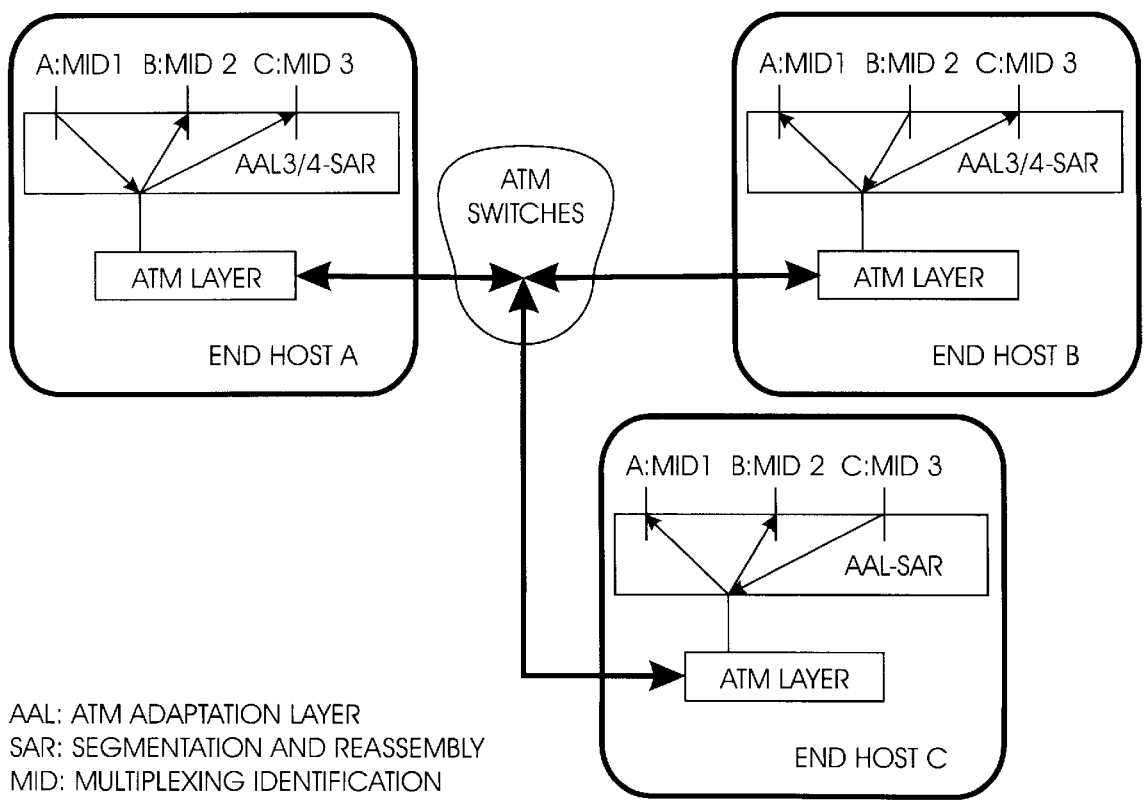
FIG. 10 is a block diagram illustrating an AAL type 3/4 multiparty-to-multiparty network layer connection in accordance with the present invention.

Multiparty-to-multiparty ATM communication requests can be realized at the ATM network layer if end hosts have some mechanism of distinguishing cells from different senders. In accordance with the present invention, this can be achieved in two ways. The AAL type 3/4 protocol specifies a multiplexing identification field ("MID") in its segmentation and reassembly ("SAR") sublayer header. As this SAR header is added to each ATM cell as shown in FIG. 9, cells originating from different end hosts multiplexed onto the same ATM connection can be distiniguished by this MID field. FIG. 10 shows a multiparty-to-multiparty connection at the ATM network layer for an end application using AAL type 3/4 protocol. Cells sent by each end host use a different MID. Thus, end host A can reconstruct B's input data stream (MID 2) separately from C's (MID 3). The other AAL protocols do not support such a field in their SAR sublayer headers or trailers.

The second method by which multiparty-to-multiparty connections can be realized at the ATM layer is more general. A set of VPIs on each ATM interface for the purpose of such connections is set aside. An on-demand connection setup request for a multiparty-to-multiparty connection is met by establishing a virtual path connection (VPC) using these VPIs (switched VPCs). Distinct VCIs are then allocated to each sending end host on this connection. Cell routing at transit nodes is done strictly based on the VPIs in the cell headers. VCIs are not translated. Data streams from different end hosts are successfully reassembled based on the VCI entries.

Figure 11:
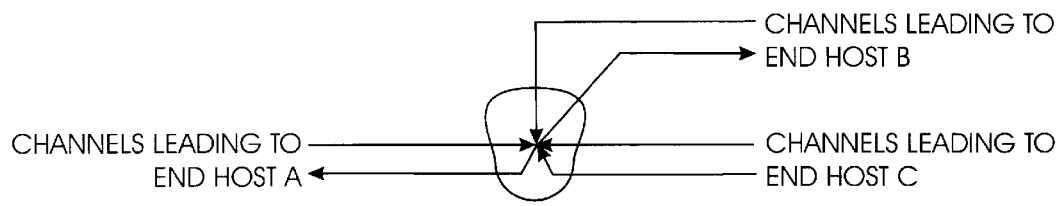
FIG. 11 is a detailed view of a multicast merge point suitable for use in conjunction with the present invention.

FIG. 11 shows the details of the channels inside the switch where the multicast and merge occurs for a three-party connection. Such a multicast merge point is needed using either the MID approach or the VP connection approach. Multiple multicast merge junction points may occur in a connection if there are more than three end hosts in the connection. The segment for one host may split-off in one switch, for the second end host in a different switch, and so forth. This arrangement is possible based on the location of the end hosts and the network topology. A key point to note, however, in FIG. 11 is that VPI/VCIs for cells incoming from two end hosts are mapped into the same VPI/VCI leading to the third end host for a merge action. Similarly, cells incoming from the channel corresponding to an end host are replicated and multicast to channels leading to the other end hosts.

Different channels on the multiparty-to-multiparty connection will have different bandwidth requirements. For example, the channel leading away from a merge point will need more bandwidth than the channels leading into it. Schemes, such as per-VC queuing, used to provide quality-of-service guarantees, are feasible using the second approach of switched virtual path connections. Since the first approach relies on MIDs to distinguish different input streams and these are not examined at the ATM switches, support for connections that require QoS guarantees will be more difficult with this approach. Also, this approach to realizing a multiparty-to-multiparty connection may not be as efficient in bandwidth or end host computing resource usage as one that is routed through an application-layer bridge in the network.

Next, a multiparty-to-multiparty ATM-layer connection setup procedure is described. A question with this procedure is which connection server issues the Start-traffic messages to synchronize the sending and receiving ends of the connection.

We assume the network configuration shown in FIG. 8 for the setup of a multiparty-to-multiparty connection between end hosts A, B, and C. Furthermore, it is assumed that the switch at which the junction point shown in FIG. 11 occurs is in the domain of connection server $CS_A$ and that $CS_A$ receives the connection setup request. Server $CS_A$ establishes its segment and sends the Setup-segment to the next connection servers $CS_B$ and $CS_C$. As part of setting up their segments, servers $CS_B$ and $CS_C$ offer the connection to their end hosts B and C, respectively. This allows these end host applications to configure themselves to send/receive on the ATM channels established as part of the connection. The Setup-segment messages from $CS_A$ to $CS_B$ and $CS_C$ are sent with the no-start-traffic option similar to that described above when the end host requesting the setup was a receiving end host. Thus, connection servers $CS_B$ and $CS_C$ send their Setup-segment responses without issuing the Start-traffic message to their corresponding end hosts. Connection server $CS_A$ sends the Start-traffic message to all the end hosts in the connection since, as stated earlier, when segments are successfully set up, it implies that the end host applications are all configured to receive data cells.

Figure 12:
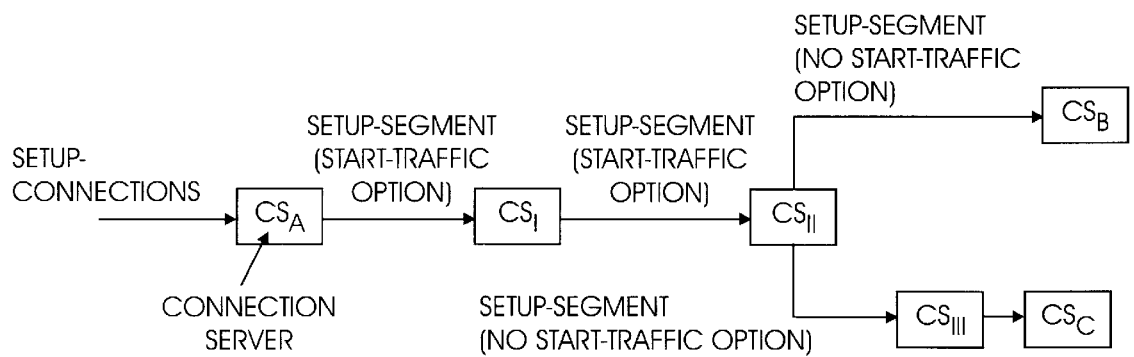
FIG. 12 is a block diagram illustrating routing through multiple domains in accordance with the present invention.

If there are intervening domains between the domains of end hosts A, B, and C, then the Setup-segment messages proceed with the start-traffic option until the point where the first split occurs. This is shown in FIG. 12. Upon receiving a Setup-connections request, connection server $CS_A$ uses either routing approach, i.e., the P-NNI shortest path based routing or the optimal table-based routing. Server $CS_A$ then determines that the connection needs to be routed through switches within the domain of $CS_1$. It thus passes the Setup-segment message with the start-traffic option enabled. This server determines that both segments leading to end hosts B and C must be routed through switches within the domain of $CS_{11}$. This server is in the domain of the switch at which the multicast merge point is located for this connection. It sends the Setup-segment message with the no-start-traffic option, as shown in FIG. 12, so that it can coordinate the start of the data transfer phase. Upon receiving responses to this message from $CS_B$ and $CS_{111}$, it sends the Start-traffic message to end hosts B and C using datagram packets. $CS_{11}$ sends the Setup-segment response back to $CS_1$ which forwards a similar response to the server $CS_A$. This server then sends the Start-traffic to end host A. Note that if end hosts B and C start their data transfer even before server $CS_A$ sends its Start-traffic to A, there is no race condition, since end host A was already configured to receive data. If there are multiple multicast merge points in the connection, the connection server in the domain where the first multicast merge point occurs starting from the connection server that received the Setup-connections request, sends the Start-traffic messages.

It is noted that the MIDs or VCIs should be distributed among the end hosts such that a unique identifier is used for each end point. These identifiers may be assigned in the original setup request by the requesting node or they can be assigned by the connection server receiving the setup request.

For tasks such as connection control of network-layer connections, network servers do not require knowledge of the application layer using the connection. Where a logical connection is one that is realized as multiple network-layer connections routed through application-layer resources, knowledge of the application riding on the connection is required to select the appropriate application-dependent resource.

The need for routing connections through special resources that perform application-layer functions has been identified for various reasons. Examples of special resources are format converters and bridges. Since heterogeneous end equipment is expected in B-ISDNs, data exchange between two end hosts may entail format conversion. The format converter used depends on the type of application data being exchanged on the connection. Similarly, in order to support multiparty-to-multiparty communication when information mixing cannot be performed at the ATM-layer, application-layer bridges are needed.

Figure 13A:
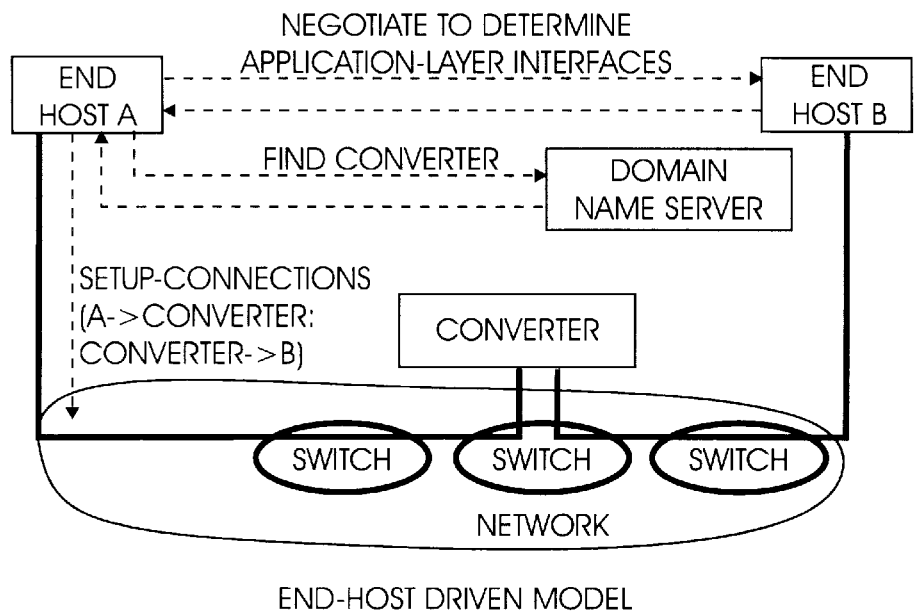
FIG. 13A illustrates an end-host driven model for finding application-layer resources suitable for use in conjunction with the present invention.
Figure 13B:
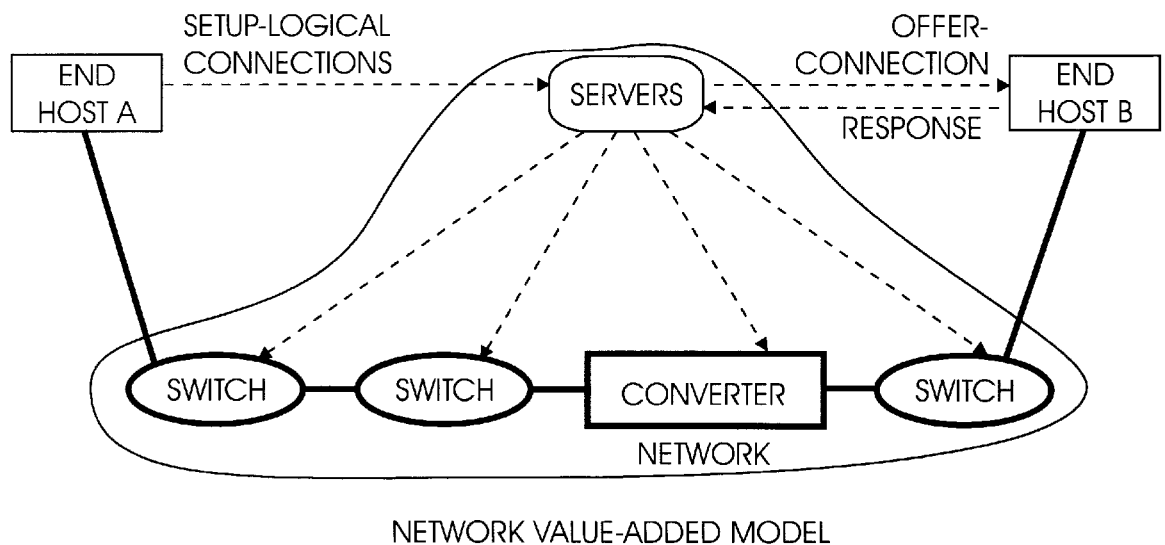
FIG. 13B illustrates a network value-added model suitable for use in conjunction with the present invention.

Format conversion and application-layer mixing can be performed at the end hosts. However, this approach is inefficient since each end host will need a variety of bridges and format converters. A more efficient method is to deploy such special resources in the network and share these resources among different end hosts. The problem is to find the correct format converter or bridge. Two models are shown in FIGS. 13A and 13B for two-party communication involving a format converter. The first model, an end-host driven model, shown in FIG. 13A uses a three-step approach. The end hosts first communicate with each other (possibly using datagram communication) to determine the type of application interfaces available at each node. Next, the calling end host communicates with the domain name server to locate an appropriate format converter if one is needed. In the third step, the end host requests the network to set up two network-layer connections, one from itself to the converter and another from the converter to the far end host. An interface to the end host allowing it to request a "logical" connection to any other end host may be provided. The network determines whether a format converter is needed and then routes the connection through an appropriate converter, if one is needed. A second mode, a network value-added model, is shown in FIG. 13B.

The present invention recognizes that it is important to accommodate both these models. This is done by providing end hosts direct access to both the logical connection control and network-layer connection control. A layered architecture, as shown in FIG. 14, allows such direct access to both layers. Application-dependent route ("ADR") servers, so named because their primary function is to route connections through application-dependent special resources, form the second layer and handle logical connection control requests. The lower layer consists of connection servers whose role is to handle network-layer connections.

The approach of providing separate direct interfaces to the end host as shown in FIG. 14 allows networks to be based on both of the models shown in FIGS. 13A and 13B. For example, an end host that would rather use the end-host driven model, can communicate directly with far-end hosts, consult name servers, and then only request network-layer connections using the Setup-connections message. On the other hand, end hosts that prefer the network value-added model can use the Setup-logical-connections message.

If only the higher-layer interface is available to an end host, the network will be burdened with having to check application-layer information for all requests. This check is an irrelevant operation for simple network-layer connections. In effect, it would increase end-to-end connection setup delay for network-layer connections and also decrease the overall network call handling capacity of the network, relative to an approach that makes available both interfaces to the end hosts.

Two solutions are available for the problem of setting up a logical connection with respect to how application-dependent information is obtained by the network. The network may store this information, or the network may determine this information through communication with the end hosts at the time of logical connection setup. By assuming that ADR servers obtain application information strictly by communication with the end hosts during logical connection setup and not using prestored user profile information in ADR servers, these servers are not associated with individual end hosts. This is unlike the approach used with connection servers. Routing information to reach end hosts is stored in connection servers which creates an association between an end host and its connection server. Thus, to provide connection control service to an end host, signaling communication with one of the connection servers in its domain is mandatory. A similar need for ADR servers is avoided by adopting the policy of ADR servers obtaining application information strictly through communication.

This allows for greatly increased flexibility in designing signaling procedures to handle the setup, modification, and release of complex connections that require application-dependent routing. The procedure for the setup of a logical connection follows.

The setup procedure for a two-party logical connection that is routed through a format converter is described in conjunction with FIG. 15. The procedure for setting up a multiparty-to-multiparty connection involving an application-layer bridge is similar to this procedure and is described below.

Presumably, an end host requests a two-party logical connection rather than a network layer connection if it is uncertain whether the far-end host has the same application interfaces as itself. Since there is no ADR server association with an end host, it can send its request via datagram communication to any available ADR server. It specifies application layer information as parameters which are similar to the high-layer compatibility parameter in ISDN signaling protocols in the setup request. The ADR server offers this logical connection to the far-end host B. Signaling communication between the ADR server and far-end host can be carried in datagram packets riding on ATM logical links through routers. In its response, end host B specifies its application layer interfaces. For example, a video application interface may be MPEG, JPEG, or NTSC. The ADR server can now decide whether a format converter is needed or not. If both end hosts have the same application interfaces, a simple two-party connection can be established for communication between the two end hosts. FIG. 15 shows the more complex situation in which the ADR server determines that a conversion is needed. It finds the appropriate format converter using name service or otherwise. It then offers the logical connection to this converter to verify if it can provide the needed format conversion for data on this connection. If accepted, the ADR server simply requests its connection server, primary or alternate, with the ADR server viewed as an end host which has its own domain and hence primary and alternate connection servers, to establish two ATM-layer connections from end host A to the format converter, and a second connection from the format converter to end host B. As described above, each third-party request is appropriately sent to a connection server, primary or alternate, of one of the end hosts or format converter, and connection setup proceeds. While sending the Setup-connections request to the connection server, the ADR server preferably sets the no-start-traffic option, similar to the one used in the Setup-segment message described above. This option causes the connection server to set up the end-to-end connection, but does not permit data transmission on the connection by withholding the Start-traffic messages. Instead, the Start-traffic messages are sent by the ADR server to ensure that both network-layer connections are fully established before data transmission starts. Otherwise, if the connection from end host A to the format converter is completed before the connection from the format converter to the end host B, data may be dropped at the format converter.

The advantage of not associating ADR servers with end hosts is that this design approach reduces signaling communication. If ADR servers stored user service profiles, then possibly two or more, based on the number of end hosts in the logical connection, ADR servers may be involved in the setup procedure, reducing the efficiency gained by using the network value-added model of FIG. 13B.

The negative cases must be considered carefully for this procedure. If, for example, the ADR server is unable to locate a format converter, it may simply issue a negative reply to the originator of the Setup-logical-connections request. On the other hand, if a bridge is unavailable to host a multiparty-to-multiparty connection, the ADR server could interpret the request as $$\binom{n}{2}$$

bidirectional two-party connections, where n is the number of end hosts in the logical connection. Additional communication between the ADR server and the end hosts can be used to determine if the end hosts will accept or reject this interpretation of the logical connection request. A combination of bridges and converters may be required to handle complex logical connection requests.

Figure 16:
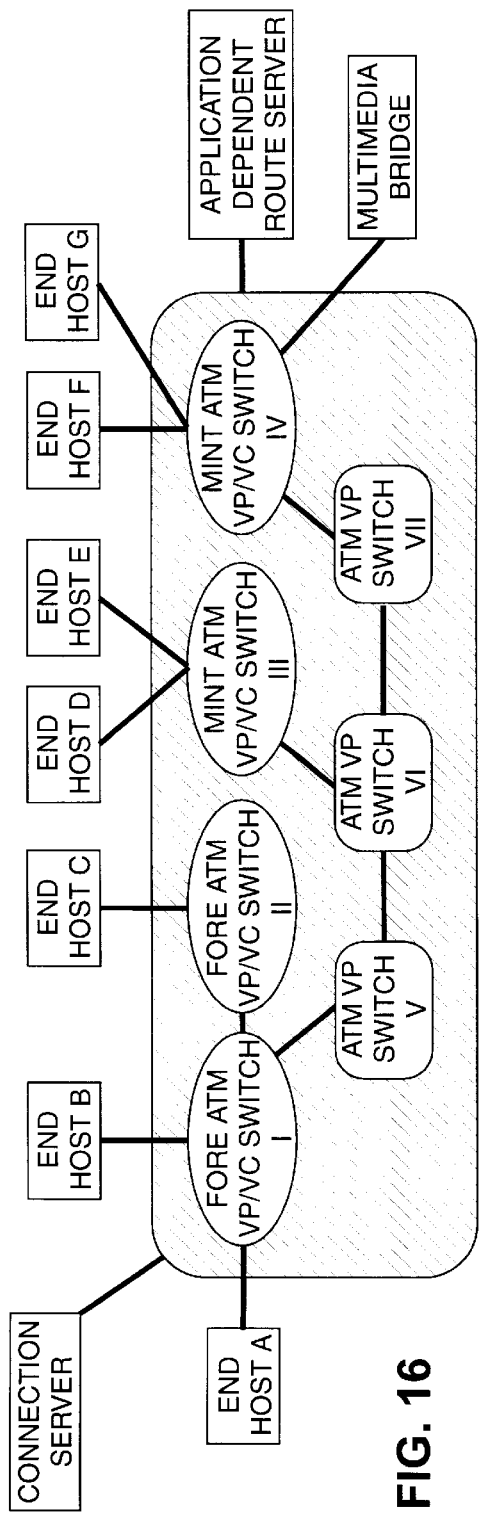
FIG. 16 illustrates a prototype test bed connection configuration for testing the present invention.

A testbed network utilized to test aspects of the present invention is shown in FIG. 16. This network consists of three VP switches, two multimedia integrated network for telecommunications ("MINT") ATM VP/VC switches described in C. B. Woodworth, M. J. Karol and R. D. Gitlin, "A Flexible Broadband Packet Switch for a Multimedia Integrated Network", Proc. ICC 1991 incorporated by reference herein and two Fore Systems ATM VP/VC switches. A total of 7 end hosts, A–G, are connected to the Fore and MINT ATM switches. The end hosts connected to the Fore switches are SUN workstations with a Fore ATM interface adapter card, and a JPEG video card. The audio capability is built-in with the workstation. The end hosts connected to the MINT switches are SUN workstations connected via ethernet to terminal adapters. Each terminal adapter has a control processor, executing the VxWorks operating system, an ATM network interface card, an audio card, and an NTSC video card. Details about the MINT terminal adapter can be obtained from C. B. Woodworth, G. D. Golden, R. D. Gitlin, "An Integrated Multimedia Terminal for Teleconferencing", Proc IEEE Globecom 1993 incorporated by reference herein. The connection server is simply a UNIX™ process executing on a SUN workstation. It communicates with the switch resource servers (at the ATM switches) using IP over ATM or IP over ethernet.

Figure 17:
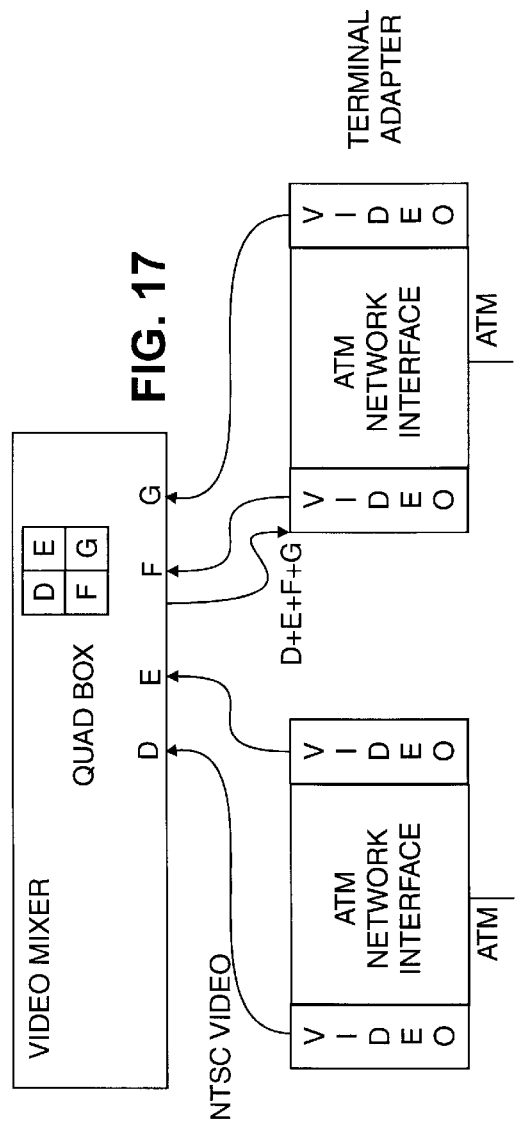
FIG. 17 illustrates a multimedia bridge video component suitable for use in conjunction with the present invention.
Figure 18:
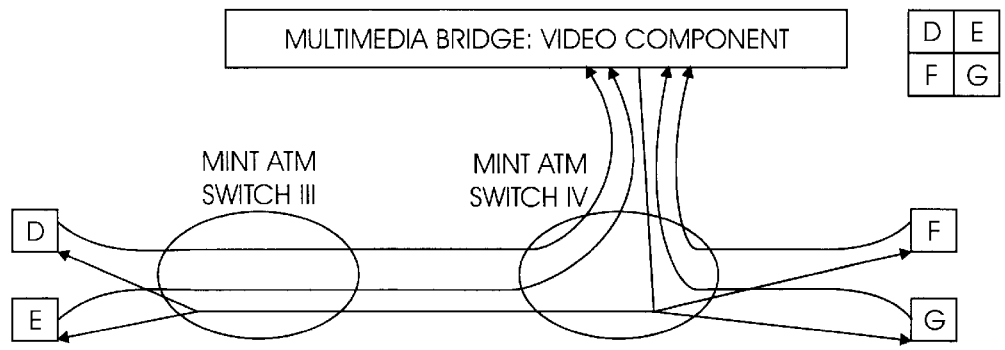
FIG. 18 illustrates a four-party to four-party video logical connection in accordance with the present invention.

The application-dependent route server is also a UNIX™ process executing on a SUN workstation. The multimedia bridge is used to mix video and audio streams from multiple sources. It is implemented using two MINT terminal adapters which convert ATM streams into video or audio streams, and off-the-shelf NTSC video and audio mixers. Further details of the video component of the multimedia bridge are shown in FIG. 17. The video mixer is a quad box that takes four input video streams, D, E, F, and G, and mixes them into one output signal (D+E+F+G) where the four quadrants correspond to the four input signals as shown in FIG. 17. The two terminal adapters convert video streams into ATM streams and vice-versa. Thus, ATM-layer connections from end hosts D and E carrying video data as ATM cells terminate on the left terminal adapter shown in FIG. 17, while ATM-layer connections from end hosts F and G terminate on the right terminal adapter. A four-party to four-party video logical connection realized using the multimedia bridge is shown in FIG. 18. Four unidirectional two-party ATM-layer connections transport video data from each end host to the multimedia bridge and one unidirectional, five-party connection, with the multimedia bridge as the sending node and the four end hosts as receiving nodes, transports the mixed video signal out to the end hosts. Assuming the network value-added model described above, the logical connection setup request for a four-party to four-party video logical connection is received by the ADR server. Given the availability of the multimedia bridge resource, the ADR server realizes this logical connection by requesting a connection server to establish the five network-layer connections shown in FIG. 18.

Figure 19:
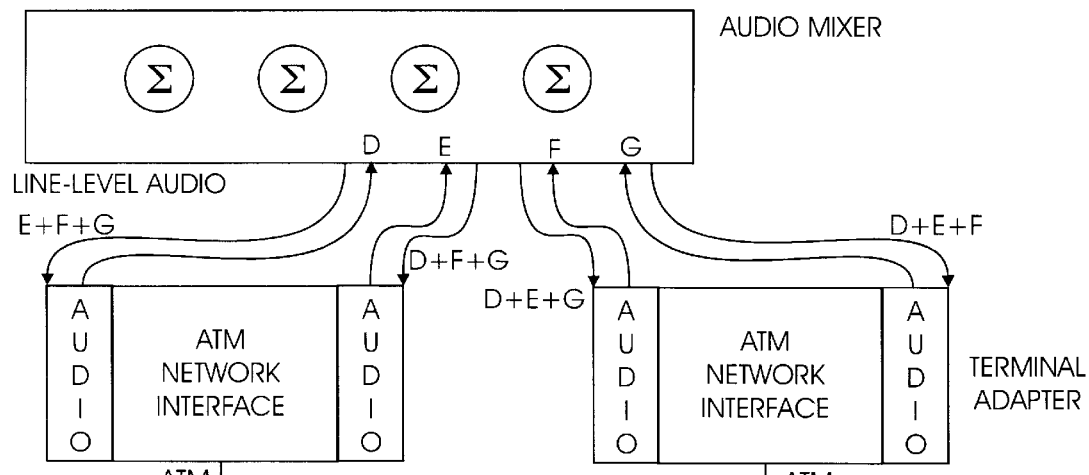
FIG. 19 illustrates a multimedia bridge audio component suitable for use in accordance with the present invention.
Figure 20:
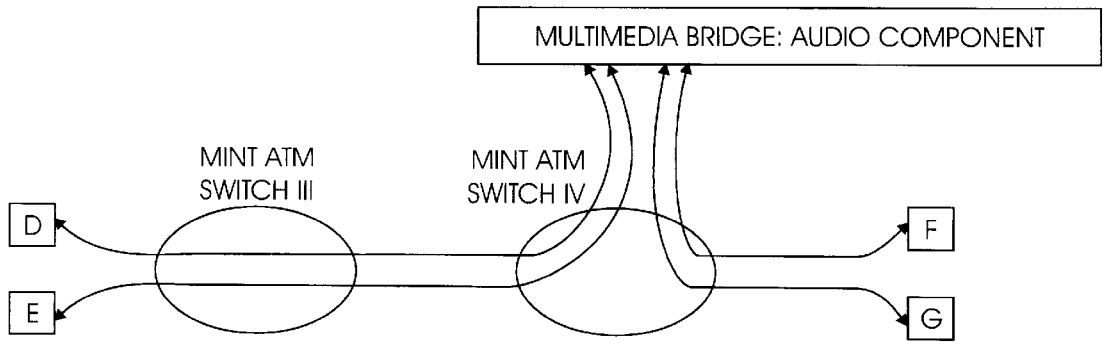
FIG. 20 illustrates a four-party to four-party audio logical connection in accordance with the present invention.

The audio component of the multimedia bridge behaves in a slightly different manner. It takes four line-level audio inputs, D, E, F, and G, and produces four output signals, each of which is a summation of three of the four input signals. This is illustrated in FIG. 19. The two terminal adapters serve the same purpose of converting line-level audio streams to ATM cells and vice versa. Given this mode of operation of the audio component of the multimedia bridge, the ADR server will interpret a four-party to four-party audio logical connection setup request in a different manner. The network-layer connections to support this logical connection are shown in FIG. 20. In the direction from any end host to the multimedia bridge only the end user's audio signal is carried. In the opposite direction, a summation of the audio signals from the remaining three end users is delivered (FIG. 19).

The PCC procedures were implemented as software on this hardware testbed of ATM switches, end hosts and multimedia bridge. This PCC software consists of four distinct types of UNIX™ processes: connection server, switch resource server, application-dependent route server, and end host signaling processes. Three types of switch resource servers were implemented, one for each type of ATM switch. Multiple instances of each type of switch resource server were executed, one for each switch. Multiple end host signaling processes were executed, one per end host and one for the multimedia bridge which, in effect, is also an end host. The connection server software was limited to handling connection control requests for single-domain networks. It will be recognized that multiple instances of this server can be executed in the same domain as described above.

Figure 21:
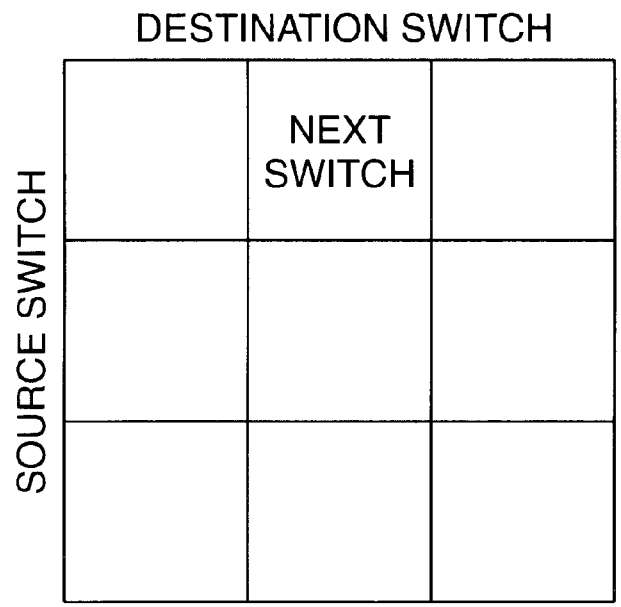
FIG. 21 illustrates a physical and logical connectivity table which may suitably be used to store routing data.

The functions implemented in each process include PCCP message processing and the actions required in the PCC algorithm to support the different procedures described herein. The connection server receives requests for the control of network-layer connections, performs route computation, and communicates with the switch resource servers as specified in the PCC procedures. The optimal table-based routing scheme was implemented. In other words, routing data for each domain was downloaded to the connection server a priori during initialization. Routing data at the connection server consisted of two tables: physical connectivity and logical connectivity. Both data tables have a similar format as shown in FIG. 21. The physical connectivity data table shows the physical topology of the network, while the logical connectivity shows the VP overlay network topology. An entry (i,j) indicates the next switch through which a connection must be routed in order to reach destination switch j from source switch i. The port numbers on the switches are indicated in the data at each entry of the table. In the logical connectivity data table, the identifier of the VP connection, and the corresponding VPIs on the links are also indicated. Upon receiving a Setup-connections request, the connection server performs route computation by iteratively reading this data table to obtain the end-to-end route of the connection. As mentioned earlier, since this implementation was limited to a single-domain network, the end-to-end routes retrieved by the connection server only involved switches. In the more general case for multiple-domain networks, the route determined by a connection server would consist of switches in its domain and the identity of the connection server in the next domain.

Switch resource servers as discussed above perform four steps during connection setup. These include connection admission control, selection of VPI/VCIs, configuring the switch fabric, and setting parameters for user-plane runtime algorithms. In our implementation, the connection admission control is a simple bandwidth check on the ports of the switch involved in the connection. Selection of VPI/VCIs and configuration of the fabric (making entries in the port/ VPI/VCI mapping table) are implemented in the switch resource server software. The MINT ATM switch has priority control. Hence, a parameter indicating the priority of the connection being setup is downloaded to the fabric during switch fabric configuration. No other user-plane algorithms were supported in the hardware available for the three ATM switches and, hence, no other parameters needed to be programmed during connection setup. Part of the switch resource server software which communicates with the connection server and maintains state machines for the channels in the connection is fabric-independent, while the part of it that sets parameters in the fabric, including port/VPI/VCI translation table entries and priority parameters, is fabric-dependent.

The ADR server determines the routing of logical connections as one or more network-layer connections passing through application-dependent special resources, such as bridges and converters. The end host signaling processes respond to connection offers from the network and generate connection requests to the network when required to do so by applications executing on the end hosts. They also configure end host terminals to receive and send cells on ATM interfaces in the end host.

Figure 22:
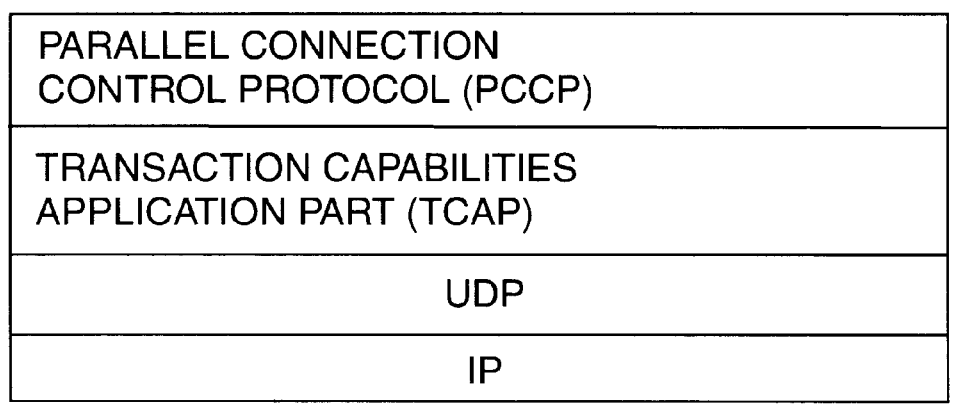
FIG. 22 illustrates a signaling protocol stack suitable for use in conjunction with the present invention.

Communication between the different processes is accomplished using PCCP messages. This protocol is based on a transactional client-server model. Transaction capabilities application part ("TCAP"), part of the Signaling System No. 7 (SS7) protocol, offers a method to invoke operations using transactions. TCAP messages are transported as UDP/IP packets instead of using the lower layers of the SS7 stack. An exemplary protocol stack is shown in FIG. 22.

A series of experiments were carried out on the above described testbed of ATM hardware and software. These experiments were designed to demonstrate the ability of the PCC software to set up and release two types of network-layer connections: two-party bidirectional and unidirectional multiparty connections. Third-party connection control, and the setup and release of logical connections, involving application-layer resources, were also tested.

A first experiment was to set up and release two-party bidirectional connections. The cases tested utilizing the network shown in FIG. 16 include connections from end host A to B; from end host B to C; from end host D to E; and from end host D to F. The experiment was designed to test the control of connections that pass through one or two MINT switches, or through one or two Fore switches. Due to the incompatibility of the physical layer used in the MINT and Fore switches, test connections spanning these different types of switches were not tested.

A second experiment was to set up and release switched virtual path connections (VPCs) passing through the ATM VP switches V, VI, and VII. No end hosts were attached to these VP switches. The focus of this experiment was to demonstrate the ease of portability of the switch resource server software to function with different switch fabrics. This also demonstrated that the PCC algorithm can be used for the control of both switched and provisioned connections, and for both virtual path and virtual channel connections.

A third experiment was to set up and release two-party bidirectional connections that span two ATM switches which are connected by a provisioned virtual path connection traversing two VP cross-connects. For example, in FIG. 16, a VP connection is provisioned from MINT switch III to switch IV passing through ATM VP switches VI and VII. In this mode, the VP switches operate as cross-connects, because they are not involved during on-demand connection setup. The routing data is set up to indicate that switch III is not directly connected to switch IV by a physical ATM link. Instead, the switches are connected by a logical bidirectional VP connection. This configuration requires that VPI data for the channels selected during on-demand connection setup be extracted from the data stored for the logical VP connection. Appropriate translation table entries are then made at the two MINT ATM VP/VC switches for the on-demand connection setup to be extracted from the data stored for the logical VP connection. Appropriate translation table entries are then made at the two MINT ATM VP/VC switches for the on-demand connection that traverses this VP connection.

A fourth experiment was made to demonstrate the ability to set up and release unidirectional multicast connections. The addresses of the sending end host and multiple receiving end hosts were specified in the Setup-connections request. Video-on-demand applications can be supported with such connections.

A fifth experiment was made to demonstrate third-party connection control. For example, in FIG. 16, end host D requests a connection to be set up from end host E to end host F. The connection server determines the route, communicates with the switch resource servers and responds back to end host D with a success or failure response.

A sixth experiment demonstrated the setup and release of logical connections. A request to set up a four-party to four-party connection for a multimedia conferencing application was handled by the ADR server. As described earlier, this server determines that connections need to be routed through an application-layer resource, the multimedia bridge. It requests five network-layer connections from the connection server using the third-party connection control facility.

To summarize, these experiments successfully demonstrated many significant advantages of the present approach over the prior art. While the invention has been disclosed in the context of presenting preferred embodiments of that invention, it will be recognized that various modifications and improvements will occur to those of ordinary skill in the art based upon the teachings herein.

We claim:

1. A method for connection setup of a switching network having a plurality of domains comprising the steps of:
   establishing a first connection segment through a first plurality of switches having setup functions in a first domain by setting up in parallel the setup functions of said first plurality of switches; and
   requesting the setup of a second connection segment through a second plurality of switches having setup functions in a second domain after successfully establishing the first connection segment.

2. The method of claim 1 further comprising the step of establishing the second connection path by setting up in parallel the setup functions of said second plurality of switches.

3. The method of claim 2, wherein said step of establishing the second connection segment further comprises the steps of reserving switch resources and configuring switches in parallel.

4. The method of claim 2 further comprising the step of connecting the first and second connection segments.

5. The method of claim 4 further comprising the steps of connecting a first end host located in the first domain to an end of the first connection segment and a second end host located in the second domain to an end of the second connection segment thereby connecting the first and second end hosts in a two party connection.

6. The method of claim 5 further comprising the steps of sending a start-traffic message from a server in the second domain to the second end host; and starting data transmission upon receipt of the start-traffic message.

7. The method of claim 6 further comprising the step of sending a response upon completion of the setup of the second connection segment from the second domain to the first.

8. The method of claim 7 further comprising the steps of sending a start-traffic message from a server in the first domain to the first end host; and starting data transmission upon receipt of the start-traffic message.

9. The method of claim 4 further comprising the steps of:
   (a) sending a release connections message upon completion of a communication;
   (b) causing a connection server in the first segment to address in parallel all switch resource servers involved in connecting the first segment asking them to release all resources associated with the connection; and
   (c) then, proceeding sequentially to the second connection segment and repeating step (b) for a connection server in the second segment.

10. The method of claim 5 further comprising the step of determining whether a quality of service requirement of the first end host is met before connecting the first end host.

11. The method of claim 5 wherein said first domain includes multiple connection servers and said method further comprises the step of backing up a first connection server with a second connection server when the first connection server is determined to be suffering a failure condition.

12. The method of claim 2 further comprising the steps of sequentially requesting and parallely making further connections across multiple domains.

13. The method of claim 1, wherein said step of establishing a first connection segment further comprises the step of receiving a setup-connections message.

14. The method of claim 13 further comprising the step of determining the route of the connection segment through the first domain in response to the receipt of the setup-connections message.

15. The method of claim 14 further comprising the step of requesting the reservation of necessary switch resources for the first connection segment.

16. The method of claim 15 further comprising the steps of determining if one or more switch resource servers do not have the necessary switch resources; responding back as to this condition; and finding an alternate switch through which to route said first connection segment.

17. The method of claim 15 further comprising the step of performing connection admission control procedures at each switch in the first connection segment.

18. The method of claim 15 further comprising the step of selecting at each switch a virtual path identifier or virtual channel identifier to the next switch.

19. The method of claim 14 wherein said step of determining the route of the connection segment further comprises the step of retreiving data from a routing table storing connection map data.

20. The method of claim 14, wherein said step of determining the route of the connection segment further comprises the step of generating a designated transit list of switches in the first domain.

21. The method of claim 15 further comprising the step of configuring in parallel setup function for all the necessary switches in the first domain.

22. The method of claim 21 further comprising the step of each switch making port, virtual path identifier and virtual channel identifier translation table entries.

23. The method of claim 22 further comprising the step of each switch setting parameters for run-time algorithms.

24. The method of claim 21 further comprising the step of each switch setting parameters for run-time algorithms.

25. The method of claim 13 further comprising the step of determining the route of the connection through the entire switching network in response to the receipt of the setup-connections message.

26. The method of claim 25 further comprising the step of employing partial segments of connections pre-established using virtual path connections in establishing a connection segment anywhere along the route of the connection through the entire switching network.

27. The method of claim 25 further comprising the step of simplifying a search for an alternative route through the switching network by having switch resource servers respond to a request for the reservation of resource, and in case one or more switch resource servers do not have the required resources, said one or more switch resource servers not having the required resources responding to a connection server, which then proceeds to find the alternative route through the switching network.

28. The method of claim 1 further comprising the step of employing partial segments of connections pre-established using virtual path connections in establishing the first connection segment.

29. The method of claim 1 further comprising the step of:
determining how to employ application-layer resources by communicating with at least one end host to be connected by the connection setup.

30. The method of claim 1 further comprising the steps of:
setting up a logical connection for at least a portion of a first connection segment; and
utilizing the switching network to set up network-layer connections.

31. A parallel connection control apparatus for controlling connection setup of a switching network having a plurality of domains comprising:
means for establishing a first connection segment through a plurality of switches having setup functions in a first domain by setting up in parallel the setup function of said first plurality of switches; and
means for requesting the setup of a second connection segment through a second plurality of switches having setup functions in a second domain after successfully establishing the first connection segment.

32. The apparatus of claim 31 further comprising means for establishing the second connection segment by setting up in parallel the setup functions of said second plurality of switches in parallel.

33. The apparatus of claim 32, wherein said means for establishing the second connection segment further comprises means for reserving switch resources in parallel and means for configuring switches in parallel.

34. The apparatus of claim 32 further comprising means for connecting the first and second connection segments.

35. The apparatus of claim 34 further comprising means for connecting a first end host located in the first domain to an end of the first connection segment and means for connecting a second end host located in the second domain to an end of the second connection segment, thereby connecting the first and second end hosts in a two party connection.

36. The apparatus of claim 35 further comprising means for determining whether a quality of service requriement of the first end host is met before connecting the first end host.

37. The apparatus of claim 35 further comprising:
means for sending a release connections message upon completion of a communication;
means for causing a connection server in the first segment to address in parallel all switch resource servers involved in connecting the first segment and asking them to release all resources associated with the connection; and
means for proceeding sequentially to the second connection segment and directing a means for causing a connection server in the second segment to address in parallel all switch resource servers involved in connecting the second segment and asking them to release all resources associated with the connection.

38. The apparatus of claim 32 further comprising a plurality of means for sequentially requesting and parallely making further connections across a plurality of additional domains.

39. The apparatus of claim 31, wherein said means for establishing a first connection segment further comprises means for generating a setup-connections message.

40. The apparatus of claim 39 further comprising means for determining the route of the connection segment through the first domain in response to the setup-connections message.

41. The apparatus of claim 40 further comprising means for requesting the reservation of necessary switch resources for the first connection segment.

42. The apparatus of claim 41 further comprising means for performing connection admission control procedures at each switch in the first connection segment.

43. The apparatus of claim 41 further comprising means of selecting at each switch a virtual path identifier or virtual channel identifier to the next switch.

44. The apparatus of claim 41 further comprising means for configuring in parallel setup functions for all the necessary switches in the first domain in parallel.

45. The apparatus of claim 44 further comprising means for each switch to make port, virtual segment identifier and virtual channel identifier translation table entries.

46. The apparatus of claim 44 further comprising means for each switch to set parameters for run-time algorithms.

47. The apparatus of claim 40, wherein the means for determining the route further comprises a routing table storing connection map data and means for retrieving said data from said routing table.

48. The apparatus of claim 40, wherein the means for determining the route further comprises means for generating a designated transit list of switches in the first domain.

49. The apparatus of claim 31 further comprising means for connecting to partial segments of connections pre-established using virtual segment connections in establishing the first connection segment.

50. The apparatus of claim 31 further comprising means for pre-establishing partial segments of connections using virtual path connections and means for connecting to said virtual path connections anywhere along the route of the connection through the entire switching network.

51. A connection setup apparatus having an acceptable end-to-end connection delay while utilizing a reduced number of pre-established virtual path connections comprising:
   a first domain having
      a first set of end hosts;
      a first set of switches and associated switch resource servers; and
      a first set of connection servers each of which is logically connected to all of the switches in the first domain;
   a second domain having
      a second set of end hosts;
      a second set of switches and associated switch resource servers; and
      a second set of connection servers each of which is logically connected to all of the switches in the second domain,
      wherein a first connection server in the first domain receives a setup-connections message from a first host in the first domain seeking a connection with a second host in the second domain, and performs a route determination routine which determines a connection segment from the first end host through the first domain responsive to the setup-connections message and the identity of a corresponding switch in the second domain; and
      said first connection server also operating to direct appropriate ones of the first set of switch resource servers to configure appropriate ones of the first set of switches to set up in parallel the connection segment from the first end host through the first domain to the corresponding connection switch in the second domain.

52. The apparatus of claim 51, wherein said first connection server also operates to determine a measure of the quality of service of the connection segment.

53. The apparatus of claim 51, wherein the corresponding connection server in the second domain operates to determine a connection segment through the second, domain to the second end host.

54. The apparatus of claim 53, wherein the corresponding connection server in the second domain directs appropriate ones of the second set of switch resource servers to configure appropriate ones of the second set of switches to set up in parallel the connection segment through the second domain to the second end host.

55. The apparatus of claim 53, wherein the corresponding connection server in the second domain directs appropriate ones of the second set of switch resource servers to configure appropriate ones of the second set of switches to set up in parallel a connection segment through the second domain to a switch in a third domain.

56. The apparatus of claim 51, wherein the first connection server further comprises a routing table.

57. The apparatus of claim 56, wherein the routing table stores sequences of switches within the domain and the identity of a connection server in the next domain for a given setup- connections message.

58. The apparatus of claim 56, wherein the routing data indicates multiple connection servers in a domain which act as backups for each other to provide increased reliability.

59. The apparatus of claim 51, wherein nodes within a domain are connected by asynchronous transfer mode ("ATM") logical links.

60. The apparatus of claim 59, wherein switches in different domains that do not have direct ATM logical links employ datagram communication.

61. A method for connection setup of a switching network having a plurality of domains while avoiding lost data due to race conditions between signaling messages and user data comprising the steps of:
   establishing a first connection from a first end host through a first plurality of switches having setup functions in a first domain by setting up in parallel the setup functions of said first plurality of switches;
   requesting the setup of a second connection segment through a second plurality of switches having setup functions to a second end host in a second domain after successfully establishing the first connection segment;
   establishing the second connection segment by setting up in parallel the setup functions of said plurality of switches;
   sending a start-traffic message to the second end host;
   responding from the second domain to the first domain upon completion of the setup of the second connection segment; and
   sending a start-traffic message to the first end host.

62. The method of claim 61 further comprising the step of commencing the transmission of data from the end hosts upon receipt of the start-traffic messages.

63. A method of connection release for a switching network having a plurality of connection segments across a plurality of domains comprising the steps of:
   utilizing a connection server in a first domain to signal all applicable switch resource servers in the first domain in parallel to ask them to release resources in connection with a connection segment in the first domain;
   releasing said resources in parallel; and
   proceeding sequentially to a next connection segment in a next domain and following the same procedure.

64. A parallel release control apparatus for controlling connection release of a switching network having a plurality of connection segments across a plurality of domains comprising:
   a first connection server in a first domain for signaling all applicable switch resource servers in parallel to ask them to release resources in connection with a connection segment in the first domain; and
   means to signal a second connection server in a next sequential domain that release of resources in the first domain is completed; the second connection server in the next domain signaling all switch resource servers in parallel to ask them to release resources in connection with a connection segment in the next domain.

65. A method to avoid lost data due to race conditions between signaling messages and user data when setting up and communicating over a multi-segment connection across a network comprising the steps of:
   setting up said connection completely in each segment before a last segment including the configuration of a calling end host to receive data;
   establishing the last segment and offering the multi-segment connection to a far end host at one end of the multi-segment connection;
   accepting the connection and enabling the reception of data on the incoming channel;
   sending a first start-traffic message to the far end host; and
   sending a second start-traffic message to the calling end host at the other end of the multi-segment connection to start data transfer while preventing any race conditions wherein data from the far end host arrive at the calling end host before the calling end host is configured to receive data.

66. A method for preventing race conditions between signaling and user data in unidirectional multiparty connection setup of a switching network having a plurality of domains comprising the steps of:
- generating a setup-connections request from a first end host which is a receiving node;
- receiving the setup-connection request at a connection server for the first end host;
- determining the route for the connection by the connection server;
- reserving resources for a first segment of the connection;
- configuring switches for the first segment of the connection;
- requesting a switch resource server allocated to a multicast point to allocate multicast virtual path or channel identifiers on two or more links;
- sending setup-segment messages to connection servers for second and third hosts, where the second host is a sending node and the third host is another receiving node;
- reserving resources and configuring switches for second and third connection segments for the second and third hosts, respectively;
- sending no start-traffic messages to the second and third end hosts;
- generating setup-segment responses back to the connection server for the first host; and
- generating a start-traffic message from the connection server for the first host and delivering the start-traffic message to the second host.

67. A method for preventing race conditions between signaling and user data in unidirectional multiparty connection setup of a switching network having a plurality of domains comprising the steps of:
- generating a setup-connections request from a first end host which is a receiving node;
- receiving the setup-connection request at a connection server for the first end host;
- determining the route for the connection by the connection server;
- reserving resources for a first segment of the connection;
- configuring switches for the first segment of the connection;
- requesting a switch resource server allocated to a multicast point in a first domain to allocate multicast virtual path or connection identifiers on two or more links;
- sending setup-segment messages to connection servers for second and third hosts, where the second host is a sending node and the third host is another receiving node;
- reserving resources and configuring switches for second and third connection segments for the second and third hosts, respectively;
- sending no start-traffic messages to the end hosts as individual segments of the connection are set up;
- generating setup-segment responses back to a connection server for the domain of the multicast point; and
- generating a start-traffic message from the connection server for the domain of the multicast point and delivering the start-traffic to the connection server for the second host.

68. An application-dependent route server for routing connections from a first end host through special resources that perform application-layer functions to a second end host comprising:
- means for obtaining application information strictly by communication with the first end host during logical connection setup;
- means for offering a logical connection consistent with said application to the second end host;
- means for analyzing application layer interface information specified by the second end host in response;
- means for deciding whether application layer interface resources are required to connect the first and second end hosts; and
- means for finding and establishing connections through any necessary application layer interface resources.

69. The apparatus of claim 68 wherein the application layer interface resource is a format converter.

70. The apparatus of claim 68 wherein the application layer interface resource is a bridge.

71. The apparatus of claim 68 further comprising:
- means for generating start-traffic messages to end hosts to initiate data transfer.

72. A method for routing a connection from a first end host having a first set of application interfaces to a second end host having a second set of application interfaces comprising the steps of:
- sending a logical connection request from the first end host via datagram communication to an available application dependent route server;
- specifying application layer information as parameters;
- offering a logical connection with said parameters to the second end host;
- the second end host responding to said offering by specifying its application layer interface information;
- deciding whether application layer interface resources are needed;
- finding the appropriate application layer interface resources; and
- utilizing the appropriate application layer interface resources in making the connection from the first end host to the second end host.

73. The method of claim 72 further comprising the step of:
- generating start traffic messages to end hosts to initiate data transfer.

* * * * *